(12) United States Patent
Ogawa et al.

(10) Patent No.: US 6,817,330 B1
(45) Date of Patent: Nov. 16, 2004

(54) INTERNAL COMBUSTION ENGINE CONTROL APPARATUS

(75) Inventors: Noriko Ogawa, Nishikamo-gun (JP); Ryuji Hayashi, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 62 days.

(21) Appl. No.: 10/420,739

(22) Filed: Apr. 23, 2003

(51) Int. Cl.[7] .............................................. F02N 11/08
(52) U.S. Cl. ................................................. 123/179.4
(58) Field of Search ........................ 123/179.4, 179.3, 123/179.5

(56) References Cited

U.S. PATENT DOCUMENTS 5,934,089 A * 8/1999 Nakagawa et al. ........... 62/133
6,532,926 B1 * 3/2003 Kuroda et al. ............ 123/179.4
6,644,055 B2 * 11/2003 Ohta et al. ................. 62/228.5

FOREIGN PATENT DOCUMENTS

DE           10211461 C1  *  7/2003   ........... F02N/11/08
JP         2001341515 A  * 12/2001   ............ B60H/1/00

OTHER PUBLICATIONS

New model Technical Guide entitled "New Car Features" for PRIUS(Toyota) dated Oct. 1997, cover and p. 6–54.

* cited by examiner

Primary Examiner—Henry C. Yuen
Assistant Examiner—Arnold Castro
(74) Attorney, Agent, or Firm—Kenyon & Kenyon

(57) ABSTRACT

A threshold value related to an engine automatic stop permission-prohibition device is variable in accordance with the cabin temperature or a value related to the cabin temperature. A width of hysteresis of the threshold value is set greater than the width needed to prevent hunting in control.

22 Claims, 13 Drawing Sheets

INTERNAL COMBUSTION ENGINE CONTROL APPARATUS

The disclosure of Japanese Patent Application No. 2001-006528 filed on Jan. 15, 2001, including the specification, drawings and abstract are incorporated herein by reference in its entirety.

BACKGROUND OF THE INVENTION

1. Field of Invention

The invention relates to an internal combustion engine that performs an automatic stop/start control of a vehicular internal combustion engine and, more particularly, to an internal combustion engine control apparatus that permits the aforementioned automatic stop if the temperature of a cooling medium of the internal combustion engine used as an air-conditioning heat source by a cabin air-conditioner is higher than a threshold, and prohibits the automatic stop/start if the temperature of the cooling medium is lower than the threshold.

2. Description of Related Art

Automatic air-conditioners for cabin air-conditioning in motor vehicles are known. The automatic air-conditioner is an apparatus that automatically maintains a set temperature in the cabin. The apparatus detects an outside air temperature and a cabin temperature using temperature sensors, and adjusts the blow-off air temperature and the air flow through the processing by an electronic control unit, thereby maintaining an appropriate air-conditioned state in the cabin. The automatic air-conditioner, when heating, efficiently uses heat from the cooling water of the internal combustion engine so as to adjust the blow-off air temperature and thereby maintain a comfortable room temperature in the cabin (Japanese Patent Application Laid-Open Publication No. 5-221233).

For improvements in fuel economy, there exist vehicles equipped with a generally-termed economy-running (hereinafter, referred to as "eco-run") system, that is, an automatic stop/start system capable of automatically stopping the internal combustion engine when the vehicle has stopped running at an intersection or the like, and allowing the vehicle to launch through automatic start-up of the engine achieved by operating a motor-generator or the like at the time of a launching operation performed by a driver. If an automatic air-conditioner is used in such a vehicle, the heating utilizing the cooling water of the internal combustion engine may become impossible due to a drop in the cooling water temperature during an automatic stop of the engine. To avoid this situation, a control of prohibiting the automatic stop of the internal combustion engine and starting the internal combustion engine is performed in some cases.

For example, a threshold value of cooling water temperature is provided. If the cooling water temperature is above the threshold value, the automatic stop of the internal combustion engine is permitted. If the cooling water temperature becomes lower than the threshold value, the automatic stop of the internal combustion engine is prohibited and the engine is started. If in this case, the required blow-off air temperature of the automatic air-conditioner is relatively low, no heating problem occurs despite a reduced cooling water temperature during a stop of the internal combustion engine. Conversely, if the required blow-off air temperature of the automatic air-conditioner is relatively high, a drop in the cooling water temperature will likely make it impossible to maintain a requested heating. Therefore, if the required blow-off air temperature is higher, the threshold value is raised so that if the cooling water temperature decreases, operation of the internal combustion engine is resumed at an early stage of the decrease in cooling water temperature, whereby the cooling water temperature is kept relatively high. In this fashion, control is performed so that the sufficient heating by the automatic air-conditioner is possible over a broad range.

At the time of transition of the cooling water temperature caused by discontinuation or start of generation of heat by the internal combustion engine due to, for example, an automatic stop or an automatic startup of the engine, the cabin temperature changes with a delay from the change in the cooling water temperature. Due to this delay, after the engine has been stopped through the automatic stop, there exists a period during which the cabin heating using the cooling water whose temperature is decreasing can be continued without any problem in the cabin comfort. According to the related-art technology, however, the automatic stop of the internal combustion engine is prohibited and operation of the engine is restarted when the cooling water temperature decreases to a threshold value (which may include a hysteresis width set so as to prevent hunting in control) that is the same as the threshold value used for the increasing cooling water temperature. Thus, the automatic stop of the internal combustion engine is ended when there still is no heating problem. This indicates that the use of a threshold as in the related-art technology does not allow full exploitation of the fuel economy improvement advantage of the automatic stop.

In a region of low blow-off air temperatures, the threshold value is set low. A reduced threshold value increases the length of time consumed for the cooling water temperature to reach the threshold value if the internal combustion engine is automatically stopped. Therefore, in that case, the automatic stop state can be maintained for a long time, and therefore, fuel economy can be sufficiently improved. Conversely, in a region of high blow-off air temperatures, the threshold value is set high due to the need for sufficiently high blow-off air temperature. Therefore, if the internal combustion engine is automatically stopped, the cooling water temperature soon reaches the threshold value, and therefore, the automatic stop ends in a short time. However, it has been found that if the cooling water temperature decreases when the required blow-off air temperature is within a high temperature region, the cabin comfort can be retained for a relatively long time despite decreasing cooling water temperature since the internal combustion engine is automatically stopped while the cabin temperature is sufficiently high. Thus, the related-art technology ends the automatic stop in a short time although the comfort of air-conditioning can be retained for a relatively long time following an automatic stop of the internal combustion engine. The related-art technology cannot be said to achieve sufficient improvement in fuel economy.

SUMMARY OF THE INVENTION

It is an object of the invention to increase the duration of the automatic stop of the internal combustion engine and therefore enhance the fuel economy improving effect by reducing the region of prohibiting the automatic stop of the internal combustion engine corresponding to the air-conditioned state in the cabin.

Means for achieving the aforementioned object and the operation and advantages thereof will be described below.

A vehicular internal combustion engine control apparatus according to a first aspect of the invention includes: engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value. The control apparatus is characterized in that the threshold value related to the engine automatic stop permission-prohibition means is variable in accordance with at least one of an inside-cabin temperature and values related to the inside-cabin temperature, and that a hysteresis width of the threshold value is set greater than a hysteresis width that is needed to prevent hunting in control.

Since the hysteresis width of the threshold value is set greater than a hysteresis width that is needed to prevent hunting in control, the threshold value for the time of decrease in the engine cooling water temperature can be set at a sufficiently low temperature side, in comparison with the threshold value for the time of increase in the engine cooling water temperature. That is, at the time of decrease in the engine cooling water temperature, the inside-cabin temperature or a value related to the inside-cabin temperature is in a state corresponding to an engine cooling water temperature that is higher than the present engine cooling water temperature due to a delay during a transitional period. Therefore, the threshold value for the time of decrease in the engine cooling water temperature can be set even lower than a threshold value that is conceived factoring in the hunting in control with respect to the threshold value for the time of increase in the engine cooling water temperature.

Since the threshold value for the time of decrease in the engine cooling water temperature can be set sufficiently low, the internal combustion engine automatic stop prohibition region can be reduced. Hence, the automatically stopped state of the internal combustion engine can be maintained for an increased length of time, thereby enhancing the fuel economy improvement advantage.

A vehicular internal combustion engine control apparatus according to a second aspect of the invention includes: engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value. The control apparatus is characterized in that the threshold value related to the engine automatic stop permission-prohibition means and a hysteresis width of the threshold value are variable in accordance with an inside-cabin temperature or a value related to the inside-cabin temperature.

Since the threshold value related to the engine automatic stop permission-prohibition means and the hysteresis width of the threshold value are variable in accordance with the inside-cabin temperature or a value related to the inside-cabin temperature, a portion of the threshold value lower than a fixed threshold value can be set by changing the threshold value in correspondence to the inside-cabin temperature or the value related to the inside-cabin temperature. Therefore, the internal combustion engine automatic stop prohibition region can be reduced, and the automatically stopped state of the engine can be maintained for an increased length of time. Hence, the fuel economy improvement advantage can be enhanced.

In addition, the hysteresis width may be expanded in accordance with the inside-cabin temperature or a value related to the inside-cabin temperature. Particularly in a region where the inside-cabin temperature or the value related to the inside-cabin temperature is high, the threshold value for the case of decreasing engine cooling water temperature can be set low. Therefore, particularly in the region where the inside-cabin temperature or the value related to the inside-cabin temperature is high, the internal combustion engine automatic stop prohibition region can be reduced. Hence, the automatically stopped state of the internal combustion engine can be maintained for a long time, and the fuel economy improvement advantage can be enhanced.

In the internal combustion engine control apparatus according to the second aspect of the invention, it is preferable that the hysteresis width be set greater than a hysteresis width that is needed to prevent hunting in control.

Since the hysteresis width of the threshold value is set greater than a hysteresis width that is needed to prevent hunting in control, the threshold value for the time of decrease in the engine cooling water temperature can be set sufficiently lower than the threshold value for the time of increase in the engine cooling water temperature. That is, at the time of decrease in the engine cooling water temperature, the inside-cabin temperature or a value related to the inside-cabin temperature corresponds to an engine cooling water temperature that is higher than the present engine cooling water temperature due to a delay during a transitional period. Therefore, the threshold value for the time of decrease in the engine cooling water temperature can be set even lower than a threshold value that is conceived factoring in the hunting in control with respect to the threshold value for the time of increase in the engine cooling water temperature.

By setting the threshold value for the time of decrease in the engine cooling water temperature at a sufficiently low level, the internal combustion engine automatic stop prohibition region can be further reduced. Hence, the automatically stopped state of the internal combustion engine can be maintained for an increased length of time, thereby enhancing the fuel economy improvement advantage.

In any one of the foregoing constructions, it is preferable that the hysteresis width be set in such a range that a cabin comfort is not degraded if the temperature of the cooling medium decreases from a state where the automatic stop is permitted by the engine automatic stop permission-prohibition means.

Therefore, since the hysteresis width is set in such a range that a cabin comfort is not degraded if the temperature of the cooling medium decreases, it is possible to sufficiently reduce the internal combustion engine automatic stop prohibition region and sufficiently enhance the fuel economy improvement advantage without discomforting an occupant in terms of air-conditioning.

In any one of the above-described constructions, it is preferable that the threshold value related to the engine automatic stop permission-prohibition means be variable in accordance with a needed blow-off temperature provided at a time of automatic air-conditioning of the cabin air-conditioner which is a value related to the inside-cabin temperature, and that the threshold value rise as the needed blow-off temperature rises.

More specifically, the threshold value may be variable in accordance with a needed blow-off temperature provided at a time of automatic air-conditioning of the cabin air-conditioner, and may be set so as to rise as the needed blow-off temperature rises.

Therefore, in the case where the needed blow-off temperature for the time of automatic air-conditioning is set low in accordance with the outside air temperature or an occupant's request, it is possible to maintain the automatically stopped state for a long time without adverse effect on air-conditioning, and enhance the fuel economy improvement advantage, in comparison with the case where the needed blow-off temperature is high. In the case where the needed blow-off temperature is set high, the automatically stopped state can be prohibited at a relatively early stage, and therefore, adverse effect on air-conditioning can be avoided, in comparison with the case where the needed blow-off temperature is low. Furthermore, in the case where the needed blow-off temperature is set high, too, the threshold value for the time of decrease in the engine cooling water temperature can be set sufficiently low, and the internal combustion engine automatic stop prohibition region can be reduced, so that the automatically stopped state of the internal combustion engine can be maintained for an increased time. Therefore, the fuel economy improvement advantage can be further enhanced.

In the above-described construction, the threshold value may be reduced for correction as an outside-cabin air temperature or an inside-cabin air temperature rises. Furthermore, the hysteresis width of the threshold value may be expanded as an outside-cabin air temperature or an inside-cabin air temperature rises. In this case, it is also preferable to expand the hysteresis width of the threshold value toward a low temperature side.

In the above-described construction, it is preferable that the hysteresis width of the threshold value related to the engine automatic stop permission-prohibition means increase as the needed blow-off temperature rises.

The degree of delay of decrease in the inside-cabin temperature with respect to decrease in the engine cooling water temperature is greater if the needed blow-off temperature is higher. That is, in the case where the needed blow-off temperature is relatively high, air-conditioning comfort is more likely to be maintained despite a decrease in the engine cooling water temperature, and therefore the hysteresis width can be set greater than in the case where the needed blow-off temperature is relatively low. Therefore, the automatically stopped state of the internal combustion engine can be maintained for an increased length of time, and the fuel economy improvement advantage can be further enhanced.

In the above-described construction, it is preferable that the threshold value related to the engine automatic stop permission-prohibition means be variable in accordance with the inside-cabin temperature, and that the threshold value decrease as the inside-cabin temperature rises.

More specifically, the threshold value is variable in accordance with the inside-cabin temperature, is set so as to decrease as the inside-cabin temperature rises. In the case where the inside-cabin temperature is relatively high, the degree of delay of degradation in the air-conditioning comfort with respect to decrease in the engine cooling water temperature is greater and therefore the threshold value can be set lower, in comparison with the case where the inside-cabin temperature is relatively low. Therefore, the automatically stopped state of the internal combustion engine can be maintained for an increased length of time, and the fuel economy improvement advantage can be further enhanced.

Furthermore, the hysteresis width of the threshold value may be expanded toward a low temperature side as the needed blow-off temperature rises.

In the above-described construction, it is preferable that the hysteresis width of the threshold value related to the engine automatic stop permission-prohibition means be variable in accordance with an outside-cabin air temperature which is a value related to the inside-cabin temperature, and that the hysteresis width increase as the outside-cabin air temperature rises.

More specifically, the hysteresis width of the threshold value is variable in accordance with the outside-cabin air temperature, and is set so as to decrease as the outside-cabin air temperature rises. In the case where the outside-cabin air temperature is relatively high, the degree of delay of degradation in the air-conditioning comfort with respect to decrease in the engine cooling water temperature is less and therefore the hysteresis width can be set greater, in comparison with the case where the outside-cabin air temperature is relatively low. Therefore, the automatically stopped state of the internal combustion engine can be maintained for an increased length of time, and the fuel economy improvement advantage can be further enhanced.

An internal combustion engine control apparatus in accordance with a third aspect of the invention includes: engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value. The control apparatus is characterized in that the threshold value is variable in accordance with a first value selected from an inside-cabin temperature and values related to the inside-cabin temperature, and that the threshold value is increase-decrease corrected in accordance with a second value that is different from the first value and that is selected from the inside-cabin temperature and the values related to the inside-cabin temperature.

Thus, the threshold value related to the engine automatic stop permission-prohibition means is variable in accordance with the first value selected from the group consisting of the inside-cabin temperature and values related to the inside-cabin temperature. Therefore, the threshold value can be set sufficiently low in accordance with a situation of air-conditioning indicated by the first value. For example, the threshold value can be set low in the case of a decrease in the engine cooling water temperature depending on the state of the first value. Therefore, the internal combustion engine automatic stop prohibition region can be reduced.

Furthermore, the threshold value is increase-decrease corrected in accordance with a second value that is different from the first value and that is selected from the group consisting of the inside-cabin temperature and the values related to the inside-cabin temperature. In this case, the threshold value can be set further low in accordance with a situation of air-conditioning indicated by the second value. Therefore, the internal combustion engine automatic stop prohibition region can be sufficiently reduced. Hence, the automatically stopped state of the internal combustion engine can be maintained for a long time, and the fuel economy improvement advantage can be further enhanced.

In the above-described construction, it is preferable that the first value be the inside-cabin temperature, and the second value be an outside-cabin air temperature.

More specifically, the inside-cabin temperature may be adopted as the first value, and the threshold value may be variable in accordance with the inside-cabin temperature. The outside-cabin air temperature may be adopted as the second value, and the threshold value may be increased or decreased for correction in accordance with the outside-cabin air temperature.

At a high inside-cabin temperature side, the threshold value may be set low if the engine cooling water temperature decreases. Therefore, particularly in a region where the inside-cabin temperature is high, the internal combustion engine automatic stop prohibition region can be reduced. Furthermore, at a high outside-cabin air temperature side, the threshold value can be corrected so as to reduce. Therefore, particularly in a region where the outside-cabin air temperature is high, the internal combustion engine automatic stop prohibition region can be further reduced.

Hence, the automatically stopped state of the internal combustion engine can be maintained for a long time, and the fuel economy improvement advantage can be further enhanced.

In addition to the above-described construction, the invention further includes the following constructions.

(i) An internal combustion engine control apparatus which executes an automatic stop-startup mode of automatically stopping a vehicular internal combustion engine if a state of operation of the internal combustion engine satisfies an automatic stop condition, and of automatically starting the internal combustion engine if the state of operation of the internal combustion engine satisfies an automatic startup condition, and which executes prohibition of the automatic stop-startup mode in accordance with decrease in the temperature of a cooling medium of the internal combustion engine used as an air-conditioning heat source by a cabin air-conditioner, the control apparatus being characterized in that a range for execution of the automatic stop-startup mode is set in such a range that a cabin temperature comfort is not degraded if the temperature of the cooling medium decreases.

(ii) An internal combustion engine control apparatus which executes an automatic stop-startup mode of automatically stopping a vehicular internal combustion engine if a state of operation of the internal combustion engine satisfies an automatic stop condition, and of automatically starting the internal combustion engine if the state of operation of the internal combustion engine satisfies an automatic startup condition, and which executes prohibition of the automatic stop-startup mode in accordance with decrease in the temperature of a cooling medium of the internal combustion engine used as an air-conditioning heat source by a cabin air-conditioner, the control apparatus being characterized in that a range for execution of the automatic stop-startup mode is set in such a range that a cabin temperature comfort is not degraded in accordance with an air-conditioning situation if the temperature of the cooling medium decreases.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
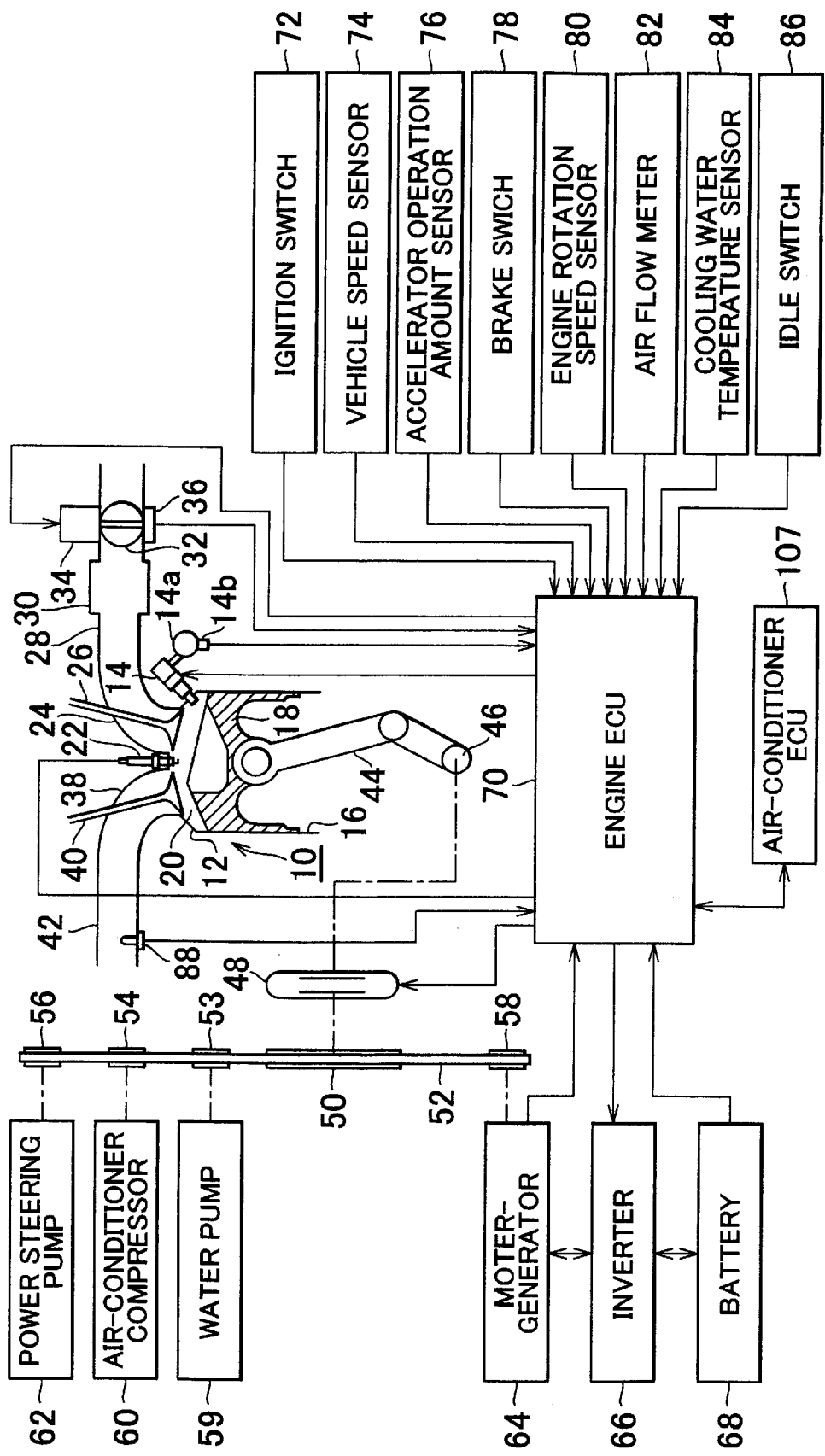
FIG. 1 is a schematic diagram illustrating the construction of an internal combustion engine control apparatus in accordance with a first embodiment applied to an internal combustion engine.

FIG. 1 is a schematic block diagram illustrating the construction of an internal combustion engine control apparatus in accordance with a first embodiment of the invention which is applied to an internal combustion engine. An internal combustion engine (hereinafter, referred to as "engine") 10 is a spark ignition direct injection type gasoline engine installed in a vehicle. A fuel injection valve 14 is provided in a cylinder head 12 of the engine 10, whereby fuel can be directly injected into a combustion chamber 20 defined by a cylinder block 16, a piston 18 and the cylinder head 12. An ignition plug 22 is disposed in a ceiling portion of the combustion chamber 20, so as to ignite a mixture formed by fuel injected from the fuel injection valve 14. The fuel injection valve 14 is supplied with high-pressure fuel from a high-pressure fuel pump (not shown) via a delivery pipe 14a. Therefore, fuel can be injected from the fuel injection valve 14 into the combustion chamber 20 even during a late period of the compression stroke. The fuel pressure in the delivery pipe 14a is detected by a fuel pressure sensor 14b.

An intake port 24 formed in the cylinder head 12 is opened and closed by an intake valve 26. Intake air is supplied to the intake port 24 via an intake passage 28. The intake passage 28 is provided with a surge tank 30. A throttle valve 32 is provided upstream of the surge tank 30. The degree of opening of the throttle valve 32 (throttle opening TA) is adjusted by an electric motor 34. The throttle opening TA is detected by a throttle opening sensor 36.

An exhaust port 38 formed in the cylinder head 12 is opened and closed by an exhaust valve 40. Exhaust gas discharged from the combustion chamber 20 into the exhaust port 38 is let out to the outside via an exhaust passage 42, an emissions control catalyst (not shown), etc.

Reciprocating movements of the piston 18 caused by combustion of air-fuel mixture within the combustion chamber 20 are converted into rotational motion of a crankshaft 46 via a connecting rod 44. The crankshaft 46 transfers drive power to wheels via a torque converter, a transmission, etc., (which are not shown).

Separately from the power transmission system, an end of the crankshaft 46 is connected to a pulley 50 via an electromagnetic clutch 48. The pulley 50 is able to perform power transfer with respect to other four pulleys 53, 54, 56, 58 via a belt 52. Among the pulleys, the pulley 53 allows the driving of a water pump 59, and the pulley 54 allows the driving of an air-conditioner compressor 60, and the pulley 56 allows the driving of a power steering pump 62.

The pulley 58 is connected to a motor-generator 64. The motor-generator 64 performs both the function as a generator that generates electric power from engine-generated power transferred from the side of the pulley 58, and the function as an electric motor that supplies drive power generated by the motor-generator 64 to the side of the pulley 58. When the motor-generator 64 functions as a generator, electric power generated thereby is sent to a battery 68 via an inverter 66. The amount of electric power generated by the motor-generator 64 is adjusted by adjusting the power supplied to the battery 68 through a phase control of the inverter 66. When the motor-generator 64 functions as a motor, electric power stored in the battery 68 is supplied to the motor-generator 64 via the inverter 66. The drive control of the motor-generator 64 is performed by the phase control of the inverter 66.

An engine controlling electronic control unit (hereinafter, referred to as "engine ECU") 70 formed by a microcomputer as a central component detects the fuel pressure from the fuel pressure sensor 14b, the throttle opening TA from the throttle opening sensor 36, the motor-generator rotation speed from a rotation speed sensor provided in the motor-generator 64, the voltage of the battery 68 or the quantity of current at the time of charge and discharge thereof, the switch state of an ignition switch 72, the vehicle speed SPD from a vehicle speed sensor 74, the amount of depression of an accelerator pedal (accelerator operation amount ACCP) from an accelerator operation amount sensor 76, the operation/non-operation of a brake pedal from a brake switch 78, the rotation speed of the crankshaft 46 (engine rotation speed NE) from an engine rotation speed sensor 80, the amount of intake air GA from an air flow meter 82, the engine cooling water temperature THW (which corresponds to the cooing medium temperature) from a cooling water temperature sensor 84, the depressed/undepressed state of the accelerator pedal from an idle switch 86, and a detected air-fuel ratio value Vox from an air-fuel ratio sensor 88 provided in the exhaust passage 42.

On the basis of data acquired as mentioned above, the engine ECU 70 adjusts the throttle opening TA by driving the electric motor 34. Furthermore, by adjusting the timing of fuel injection from the fuel injection valve 14, the engine ECU 70 causes fuel to be injected into the combustion chamber 2 during the intake stroke so as to conduct a uniform combustion, and causes fuel to be injected into the combustion chamber 20 during a later period of the compression stroke so as to conduct a stratified charge combustion. Furthermore, as described below, if an automatic stop condition is fulfilled, the engine ECU 70 stops the fuel injection from the fuel injection valve 14, thereby automatically stopping operation of the engine 10. If an automatic startup condition is fulfilled as described below, the engine ECU 70 causes the crankshaft 46 to be turned by drive force from the motor-generator 64 via the pulley 58, the belt 52, the pulley 50, and the currently-engaged electromagnetic clutch 48, so as to start the engine 10. Besides the aforementioned operations, the engine ECU 70 executes an ignition timing control, and various other controls needed for operations of the internal combustion engine.

Figure 2:
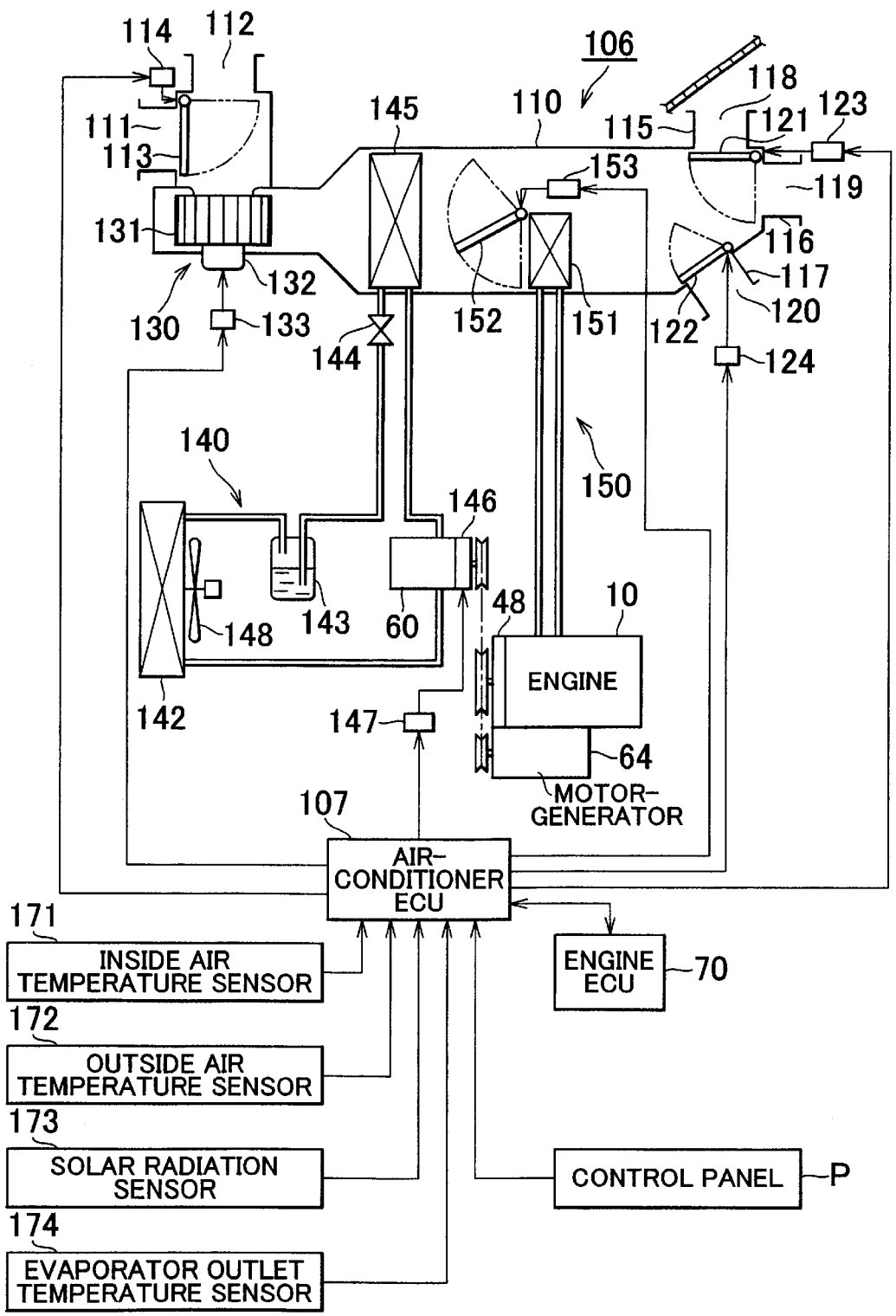
FIG. 2 is a diagram illustrating the construction of an air-conditioner unit that performs the air-conditioning of the cabin of a motor vehicle in accordance with the first embodiment.

FIG. 2 illustrates the construction of an air-conditioner unit 106 that performs the air-conditioning of the cabin of a motor vehicle. The air-conditioner unit 106 is an automatic air-conditioner designed to perform an automatic control of maintaining a set temperature in the cabin through control by an air-conditioner controlling electronic control unit (hereinafter, referred to as "air-conditioner ECU") 107 formed mainly by a microcomputer as a central component. The air-conditioner unit 106 is made up of an air-condition duct 110 that forms an air passage for conducting air-conditioned air into the cabin, a centrifugal blower 130 that produces an air stream within the air-condition duct 10, a refrigeration cycle 140 for cooling the cabin by cooling the air flowing in the air-condition duct 110, a cooling water circuit 150 that introduces the cooling water from the engine 10 (which corresponds to a cooling medium) in order to heat the cabin by heating the air flowing in the air-condition duct 110, etc.

The air-condition duct 110 is disposed at a forward side in the cabin. An upstream-most side (upwind side) of the air-condition duct 110 has an inside air inlet opening 111 for taking in air from the inside of the cabin (hereinafter, referred to as "inside air"), and an outside air inlet opening 112 for taking in air from the outside of the cabin (hereinafter, referred to as "outside air").

An inside-outside air switching damper 113 is pivotably disposed inside the inside air inlet opening 111 and the outside air inlet opening 112. The inside-outside air switching damper 113 is driven by an actuator 114 formed by a servo-motor or the like so as to change the inlet opening mode among an inside air circulation mode, an outside air introduction mode, etc.

Portions forming an outlet switching box, that is, a defroster opening portion, a face opening portion, and a foot opening portion, are formed at a downstream-most side (downwind side) of the air-condition duct 110. A defroster duct 115 is connected to the defroster opening portion. A downstream-most side end of the defroster duct 115 has a defroster outlet opening 118 that lets out mainly warm air toward the inside surface of a windshield of the vehicle.

A face duct 116 is connected to the face opening portion. A downstream-most side end of the face duct 116 has a face outlet opening 119 that lets out mainly cold air toward a head-chest portion of an occupant. A foot duct 117 is connected to the foot opening portion. A downstream-most side end of the foot duct 117 has a foot outlet opening 120 that lets out mainly warm air toward a foot portion of an occupant.

Two outlet switching dampers 121, 122 are pivotably disposed inside the aforementioned outlet openings. The two outlet switching dampers 121, 122 are driven by actuators 123, 124 formed by servo-motors or the like, respectively, so as to change the outlet mode among a face mode, a high-level mode, a foot mode, a foot/defroster mode, and a defroster mode.

The centrifugal blower 130 has a centrifugal fan 131 that is rotatably contained in a scroll case formed integrally with the air-condition duct 110, and a blow motor 132 that rotates the centrifugal fan 131. The amount of air flow caused by the blow motor 132 (rotation speed of the centrifugal fan 131) is controlled on the basis of a blow terminal voltage applied thereto via a blow drive circuit 133.

The refrigeration cycle 140 is made up of the compressor 60 that compresses a coolant when driven by the engine 10 or the motor-generator 64, a condenser 142 that condenses and liquefies the compressed coolant, a receiver 143 that separates the condensed and liquefied coolant into gas and liquid parts, and lets only the liquid coolant flow downstream, an expansion valve 144 that decompresses and expands the liquid coolant, an evaporator 145 that evaporates the decompressed and expanded coolant, a coolant piping that connects the components in a circuit manner, etc.

The compressor 60 is connected with an electromagnetic clutch 146 that connects and disconnects transfer of drive power from the engine 10 or the motor-generator 64 to the compressor 60. The electromagnetic clutch 146 is controlled by a clutch drive circuit 147. When the electromagnetic clutch 146 is turned on, drive power from the engine 10 or the motor-generator 64 is transferred to the compressor 60, so that an air cooling operation by the evaporator 145 is performed. When the electromagnetic clutch 146 is turned off, the compressor 60 is disconnected from the engine 10 or the motor-generator 64, thereby stopping the air cooling operation performed by the evaporator 145. The condenser 142 is an outside-cabin heat exchanger that is located such that it can easily receive wind caused by the running of the vehicle (hereinafter, referred to as "run wind"), and that conducts heat exchange between the coolant flowing inside and the run wind and/or the outside air sent by a cooling fan 148.

The cooling water circuit 150 is a circuit for circulating the cooling water subjected to heat exchange in the water jacket of the engine 10 via the water pump 59 driven by the engine 10 or the motor-generator 64, and has a radiator, a thermostat (which are not shown), and a heater core 151.

The heater core 151, which corresponds to a heating heat exchanger, allows the cooling water warmed in exchange for cooling the engine 10 to flow therein, and heats cold air using the cooling water as a heat source.

The heater core 151 is disposed in the air-condition duct 110 downstream of the evaporator 145 so as to partially close the air passage. An air mix damper 152 is pivotably disposed upstream of the heater core 151. The air mix damper 152 is driven by an actuator 153 formed by a servo-motor or the like, and adjusts the blow-off temperature of air blown out into the cabin by adjusting the proportion between the amount of air that passes through the heater core 151 and the amount of air that bypasses the heater core 151 in accordance with the stopped position of the damper.

The air-conditioner ECU 107 and the engine ECU 70 are interconnected for communication, and exchange data needed for controls. The air-conditioner ECU 107 is connected with a control panel P provided at the front side of the cabin, an inside air temperature sensor 171 for detecting the air temperature in the cabin, an outside air temperature sensor 172 for detecting the air temperature outside the cabin, a solar radiation sensor 173 for detecting the intensity of solar radiation into the cabin, an evaporator outlet temperature sensor 174 for detecting the cooled air temperature at the outlet of the evaporator 145, etc. Therefore, the air-conditioner ECU 107 receives inputs of switch signals from various switches provided on the control panel P, and sensor signals from various sensors. The switches on the control panel P include, for example, an air-conditioner switch for commanding the activation and stop of the compressor 60 by engaging and disengaging the electromagnetic clutch 146, an inlet changing switch for changing the inlet mode, a temperature setting lever for setting the inside-cabin temperature at a desired temperature, an air volume changing lever for changing the amount of air blown by the centrifugal fan 131, an outlet changing switch for changing the outlet mode, etc.

Figure 3:
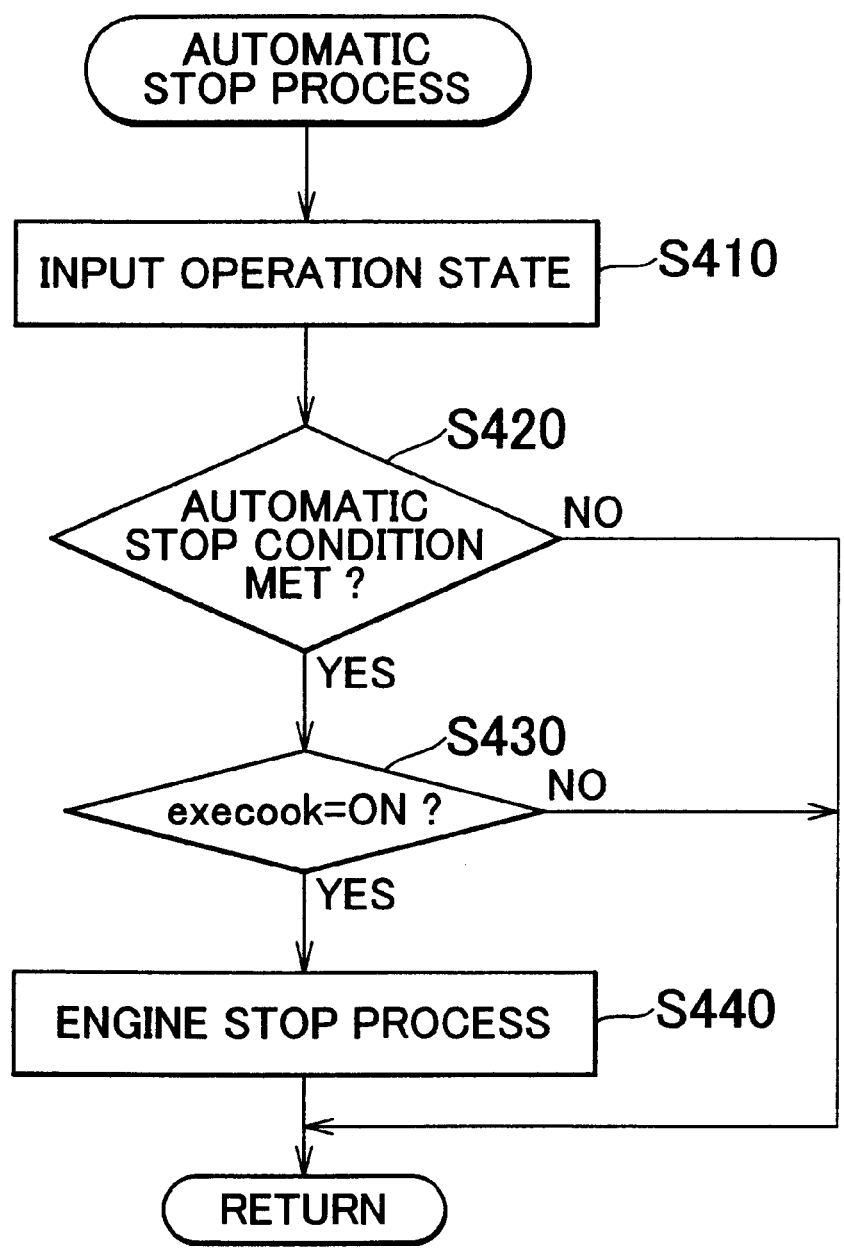
FIG. 3 is a flowchart illustrating an automatic stop process executed by an engine ECU in the first embodiment.
Figure 4:
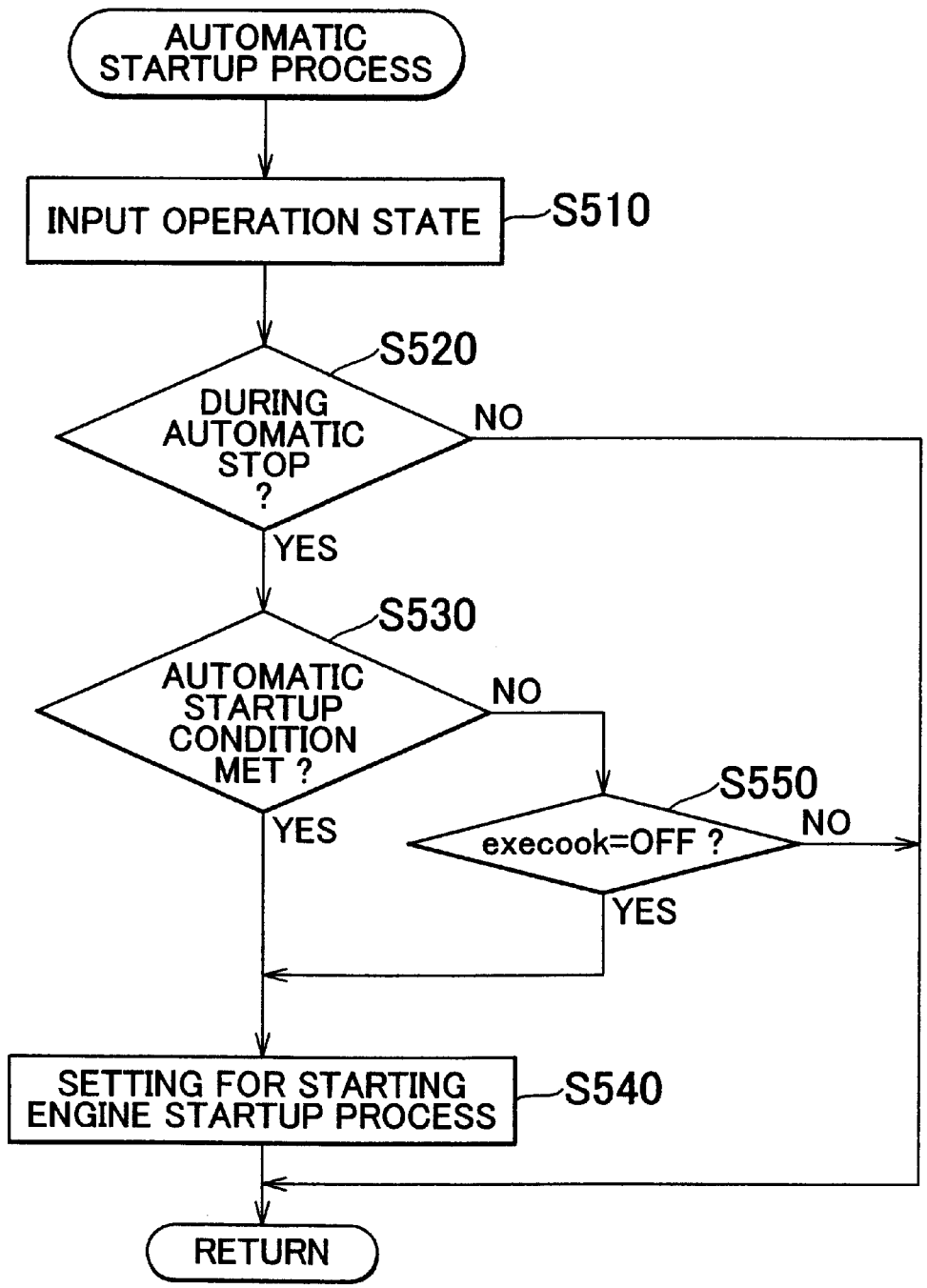
FIG. 4 is a flowchart illustrating an automatic startup process executed by the engine ECU in the first embodiment.

Next described will be an automatic stop process and an automatic startup process performed by the engine ECU 70. FIG. 3 is a flowchart illustrating an automatic stop process. FIG. 4 is a flowchart illustrating an automatic start-up process. These processes are repeatedly executed in short-time cycles.

When the automatic stop process (FIG. 3) begins, the engine ECU 70 reads an operation state for determining whether to execute the automatic stop (S410). For example, the engine ECU 70 inputs, the engine cooling water temperature THW detected by the cooling water temperature sensor 84, the operation/non-operation of the accelerator pedal detected via the idle switch 86, the amount of charges stored in the battery 68, the operation/non-operation of the brake pedal detected via the brake saitch 78, the vehicle speed SPD detected via the vehicle speed sensor 74, etc., into work areas of the RAM provided in the engine ECU 70.

Next, it is determined whether an automatic stop condition is fulfilled on the basis of the aforementioned vehicle operation state (S420). The engine ECU 70 determines that the automatic stop condition is met, for example, if all the following conditions (1) to (5) are fulfilled: (1) a condition that the engine 10 has already been warmed up, and is not overheated (the engine cooling water temperature THW is lower than a water temperature upper limit value THWmax, and is higher than a water temperature lower limit value THWmin); (2) a condition that the accelerator pedal is not depressed (the idle switch 86 is on); (3) a condition that the amount of charges stored in the battery 86 is greater than or equal to a certain amount; (4) a condition that the brake pedal is depressed (the brake switch 78 is on); and (5) a condition that the vehicle is stopped (the vehicle speed SPD is 0 km/h).

If any one of the conditions (1) to (5) is unfulfilled, it is determined that the automatic stop condition is not met (NO at S420), and the process temporarily ends. Conversely, if the automatic stop condition is met as a driving person stops the vehicle at an intersection or the like (YES at S420), it is subsequently determined whether an eco-run execution permission flag execook is "ON" (S430). The eco-run execution permission flag execook is a flag set in an eco-run execution permission-prohibition determining process in which it is determined whether to permit or prohibit an eco-run stop of the engine 10 in association with air-conditioning as described below. If execook="OFF" (NO at S430), indicating that the automatic stop of the engine 10 is prohibited, the process temporarily ends. That is, although the automatic stop condition is met, the automatic stop of the engine 10 is not executed.

Conversely, if execook="ON", indicating that the automatic stop of the engine 10 is permitted, an engine stopping process is executed (S440). For example, the fuel injection from the fuel injection valve 14 is stopped, and the control of igniting the mixture in the combustion chamber 20 via the ignition plug 22 is also stopped. As a result, the fuel injection and the ignition stop, and the engine 10 immediately stops operating. After that, the process temporarily ends. In this manner, the automatic stop process can be executed.

The automatic startup process (FIG. 4) will next be described. When the automatic startup process begins, the engine ECU 70 first reads a state of vehicle operation for determining whether to execute the automatic startup (S510). For example, the engine ECU 70 inputs the same data as in S410, that is, the engine cooling water temperature THW, the operation/non-operation of the accelerator pedal, the amount of charges stored in the battery 86, the operation/non-operation of the brake pedal, the vehicle speed SPD, etc., into work areas of the RAM.

Subsequently, it is determined whether the engine 10 is in an automatically stopped state (S520). If the engine I/O is not in the automatically stopped state (NO at S520), the process temporarily ends.

Conversely, if the engine I/O is in the automatically stopped state (YES at S520), it is subsequently determined whether an automatic startup condition is met on the basis of the aforementioned vehicle operation state input in step S510 (S530). The engine ECU 70 determines that the automatic startup condition is met, for example, if any one of the following conditions (1) to (5) is unfulfilled: (1) a condition that the engine I/O has already been warmed up, and is not overheated (the engine cooling water temperature THW is lower than the water temperature upper limit value THWmax, and is higher than the water temperature lower limit value THWmin); (2) a condition that the accelerator pedal is not depressed (the idle switch 86 is on); (3) a condition that the amount of charges stored in the battery 86 is greater than or equal to a certain amount: (4) a condition that the brake pedal is depressed (the brake switch 78 is on); and (5) a condition that the vehicle is stopped (the vehicle speed SPD is 0 km/h). Although the aforementioned automatic startup conditions (1) to (5) are the same as those used for determination regarding the automatic stop condition, the aforementioned conditions are not restrictive, and conditions other than the conditions (1) to (5) may also be set. It is also possible to adopt sleeted one or more of the conditions (1) to (5).

If any one of the conditions (1) to (5) becomes unfulfilled, it is determined that the automatic startup condition is met (YES at S530). Then, the engine ECU 70 performs a setting for starting an engine startup process (S540), after which the process temporarily ends. Due to the setting for starting the engine start-up process in step S540, the engine ECU 70 brings the electromagnetic clutch 48 into an engaged state, and drives the motor-generator 64. Therefore, the crankshaft 46 of the engine I/O is rotated. Furthermore, a fuel injection process and an ignition timing control process for the startup time are executed, whereby the engine 10 is automatically started up. After the engine startup is completed, a normal fuel injection control process, a normal ignition timing control process and other processes needed to operate the engine are started.

Conversely, if all the conditions (1) to (5) are fulfilled, it is determined that the automatic startup condition is not met (NO at S530). Subsequently, it is determined whether the eco-run execution permission flag execook is "OFF" (S550). If execook="OFF" (YES at S550), indicating that the automatic stop of the engine 10 is prohibited, then the engine ECU 70 goes to step S540, in which the engine ECU 70 makes the setting for starting the engine startup process as mentioned above.

Conversely, if execook="ON" NO at S550), indicating that the automatic stop of the engine 10 is permitted, the engine ECU 70 temporarily ends the process.

Figure 5:
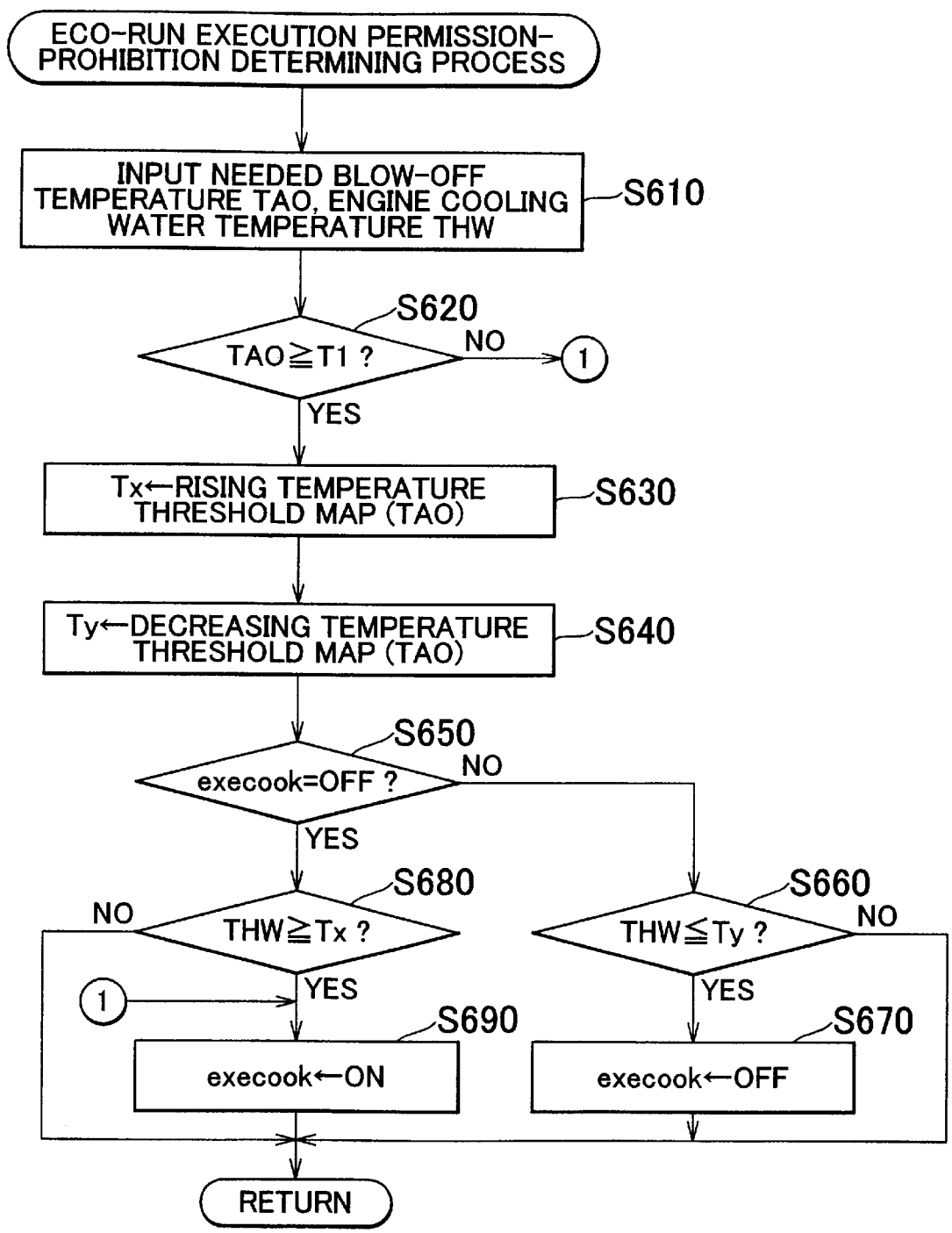
FIG. 5 is a flowchart illustrating an eco-run execution permission-prohibition determining process executed by the engine ECU in the first embodiment.

Next described will be the eco-run execution permission-prohibition determining process executed by the air-conditioner ECU 107. The eco-run execution permission-prohibition determining process is illustrated by the flowchart of FIG. 5. This process is repeatedly executed in a short time cycle.

When the eco-run execution permission-prohibition determining process begins, a needed blow-off temperature TAO and the engine cooling water temperature THW are first input (S610). The needed blow-off temperature TAO is a value calculated in the eco-run control process executed by the air-conditioner ECU 107, and corresponds to a target blow-off temperature of the air blown out into the cabin. For example, the needed blow-off temperature TAO is calculated as a target blow-off temperature of the air blown out into the cabin, from a set temperature and detected values obtained via the inside air temperature sensor 171, the outside air temperature sensor 172, the solar radiation sensor 173, and the evaporator outlet temperature sensor 174, as in mathematical expression 1 pre-stored in the ROM.

$$TAO \leftarrow KSET \times TSET - KR \times TR - KAM \times TAM - KS \times TS + C \quad [1]$$

where TSET is the set temperature set by the temperature setting lever provided on the control panel P; TR is the inside air temperature detected by the inside air temperature sensor 171; TAM is the outside air temperature detected by the outside air temperature sensor 172; and TS is the amount of solar radiation detected by the solar radiation sensor 173. Furthermore, in mathematical expression 1, KSET, KR, KAM and KS are gains, and C is a constant for correction. As can be understood from mathematical expression 1, the needed blow-off temperature TAO tends to increase with decreases in the inside air temperature TR and the outside air temperature TAM. The needed blow-off temperature TAO also tends to increase with decreases in the solar radiation TS.

Figure 6:
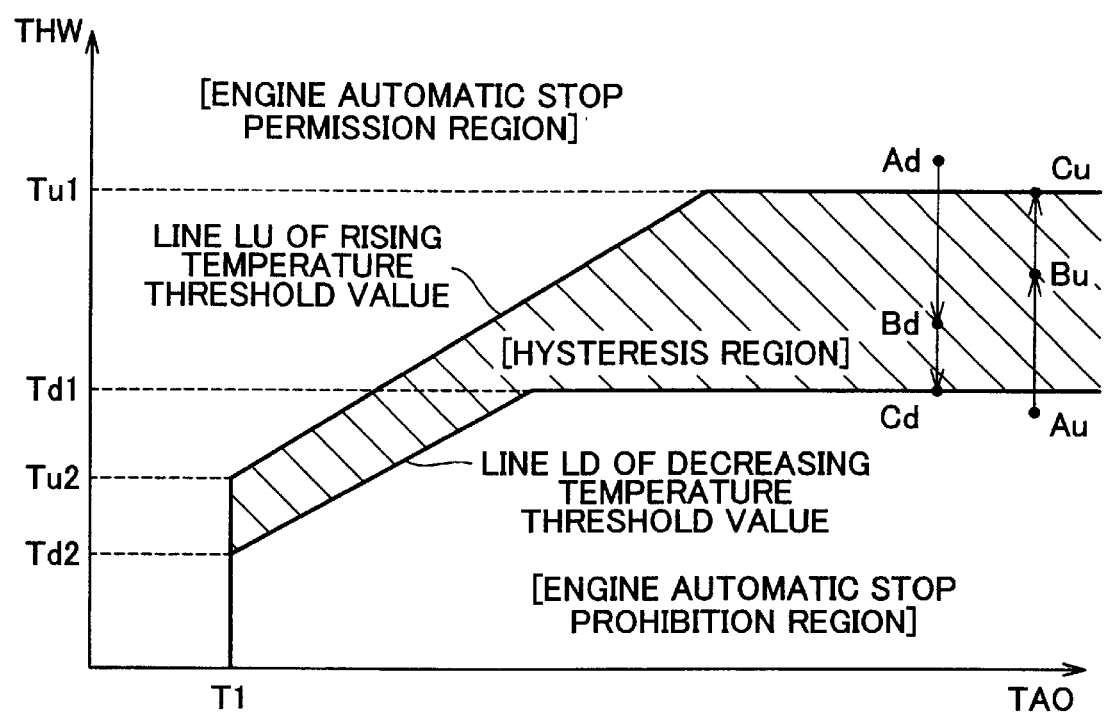
FIG. 6 is a graph indicating engine automatic stop permission and prohibition regions that represent states of threshold values used in the eco-run execution permission-prohibition determining process in the first embodiment.

Subsequently, it is determined whether the needed blow-off temperature TAO is greater than or equal to a reference temperature T1 (S620). The reference temperature T1 represents a boundary of the engine automatic stop prohibition region where the engine automatic stop is prohibited, as indicated in the graph of FIG. 6. If TAO<T1 (NO at S620), indicating that the needed blow-off temperature TAO is within the engine automatic stop permission region where the engine automatic stop is permitted, the eco-run execution permission flag execook is then set to "ON" (S609), and the process temporarily ends without further processing. That is, if TAO<T1, the engine automatic stop is permitted in view of heating.

Conversely, if TAO>T1 (YES at S620), a rising temperature threshold value Tx is computed from a rising temperature threshold map based on the value of needed blow-off temperature TAO (S630). The rising temperature threshold map corresponds to a line LU of the rising temperature threshold value within the region of TAO>T1 indicated in FIG. 6. That is, the value of the rising temperature threshold map increases with rises in the needed blow-off temperature TAO, and stabilizes at a substantially constant value at a side of high needed blow-off temperature TAO.

The reference temperature T1 used in step S620 is provided with a hysteresis so as to avoid hunting in control. Subsequently, a decreasing temperature threshold value Ty is computed from a decreasing temperature threshold map on the basis of the value of needed blow-off temperature TAO (S640). The decreasing temperature threshold map corresponds to a line LD of the decreasing temperature threshold value in the region of TAO≧T1 indicated in FIG. 6. That is, the value of the decreasing temperature threshold map increases in accordance with rises in the needed blow-off temperature TAO, and stabilizes at a substantially constant value at the side of high needed blow-off temperature TAO, in a state where the value of the decreasing temperature threshold is less than the value of the rising temperature threshold map.

The region between the line LU of the rising temperature threshold value and the line LD of the decreasing temperature threshold value is a hysteresis region. That is, if the engine cooling water temperature THW is rising during the state of the eco-run execution permission flag execook= "OFF", the line LU of the rising temperature threshold value becomes a threshold value for changing the eco-run execution permission flag execook to the "ON" state. Conversely, if the engine cooling water temperature THW is decreasing during the state of the eco-run execution permission flag execook="ON", the line LD of the decreasing temperature threshold value becomes a threshold value for changing the eco-run execution permission flag execook to the "OFF" state.

The aforementioned line LU of the rising temperature threshold value is set, taking into consideration the delay of cabin temperature with respect to increase in the engine cooling water temperature THW, and is set so that once the line LU is reached as temperature rises, a blow-off temperature that does not discomfort an occupant is achieved. After the line LU is reached, the cabin temperature rises with a delay relative to the engine cooling water temperature THW. Therefore, if the engine 10 is automatically stopped and the engine cooling water temperature THW begins to drop from the line LU of the rising temperature threshold value, the decreasing blow-off temperature does not discomfort an occupant for a certain time.

The line LD of the decreasing temperature threshold value is set, taking into consideration the delay of the cabin temperature with respect to decrease in the engine cooling water temperature THW. Therefore, the width of hysteresis set between the line LU of the rising temperature threshold value and the line LD of the decreasing temperature threshold value is considerably greater than the width of hysteresis to be set for the purpose of preventing hunting in control (which, in this case, means frequent changing between the prohibition and permission of execution of the eco-run) (the width being, for example, 1° C.). For example, in FIG. 6, the width Tu1–Td1 at the side of high needed blow-off temperature TAO is set at about 15° C., and the width Tu2–Td2 at the side of low needed blow-off temperature TAO is set at about 5° C.

Subsequently, it is determined whether the present state of the eco-run execution permission flag execook="OFF" (S650). If the eco-run execution permission flag execook= "ON" (NO at S650), it is subsequently determined whether the engine cooling water temperature THW is less than or equal to the decreasing temperature threshold value Ty. (S660). If THW>Ty (NO at S660), the process temporarily ends without further processing.

For example, a case where operation of the engine 10 is stopped due to execution of step S440 in response to fulfillment of the automatic stop condition during the state of execook="ON" in the automatic stop process (FIG. 3), and therefore the engine cooling water temperature THW is decreasing, will be considered below. If the engine cooling water temperature THW drops from a point Ad to a point Bd, the eco-run execution permission flag execook="ON" is maintained because THW>Ty at the point Bd. Therefore, if it is determined in step S530 in the automatic startup process (FIG. 4) that the automatic startup condition is not met (NO at S530), a determination of "NO" is made at step S550, and the automatically stopped state is maintained.

Then, as the automatic stop of the engine 10 continues and the engine cooling water temperature THW gradually decreases to the state of THW≦Ty (YES at S660) as indicated at a point Cd in FIG. 6, the eco-run execution permission flag execook is set to the "OFF" state (S670). Therefore, since a determination of "YES" is made in step S550 in the automatic startup process (FIG. 4) although it is determined in step S530 that the automatic startup condition is not met (NO at S530), step S540 is executed, thereby starting to operate the engine 10. In the automatic stop process, too, since the eco-run execution permission flag execook is "OFF" although it is determined in step S420 that the automatic stop condition is met (YES at S420), the answer to step S430 is "NO", so that the operating state of the engine 10 is maintained.

If the eco-run execution permission flag execook="OFF" is set, a determination of "YES" is made in step S650 in the next control cycle of the eco-run execution permission-prohibition determining process (FIG. 5). Subsequently, it is determined whether the engine cooling water temperature THW is higher than or equal to the rising temperature threshold value Tx (S680). As long as THW<Tx (NO at S680), the process temporarily ends without further processing.

If operation of the engine 10 is started in response to the eco-run execution permission flag execook="OFF" as described above, the engine cooling water temperature THW starts to gradually rise. For example, if the engine cooling water temperature THW rises from a point Au to a point Bu as indicated in FIG. 6, the eco-run execution permission flag execook="OFF" is maintained since THW<Tx at a point Bu. Therefore, even if it is determined in step S420 in the automatic stop process (FIG. 3) that the automatic stop condition is met (YES at S420), a determination of "NO" is made in step S430, so that the operating state of the engine 10 continues.

Then, as the engine 10 continues operating and the engine cooling water temperature THW gradually rises to the state of THW>Tx (YES at S680) as indicated at a point Cu in FIG. 6, the eco-run execution permission flag execook is set to the "ON" state (S690). Therefore, since a determination of "YES" is made in step S430 in the automatic stop process (FIG. 3) if it is determined in step S420 that the automatic stop condition is met (YES at S420), step S440 is executed. Thus, the automatic stop of the engine 10 can be executed. In the automatic startup process (FIG. 4), too, a determination of "NO" is made at step S550 if it is determined that the automatic startup condition is not met (NO at S530). Therefore, the engine 10 is not forcibly started up. In this manner, the automatic stop and automatic startup by the normal eco-run control can be executed.

Although the setting of the eco-run execution permission flag execook is carried out in the eco-run execution permission-prohibition determining process (FIG. 5), the setting of the eco-run execution permission flag execook may also be carried out on the basis of other conditions in accordance with needs. For example, if the inside air temperature TR is considerably low (e.g., 15° C. or lower), the eco-run execution permission flag execook may be set to the "OFF" state so as to prohibit the eco-run control.

In the above-described construction of the first embodiment, steps s410, S420 and S440 in the automatic stop process (FIG. 3) and steps S510 to S540 in the automatic startup process (FIG. 4) correspond to processes as engine automatic stop-startup means. Furthermore, step S430 in the automatic stop process (FIG. 3), step S550 in the automatic startup process (FIG. 4), and the eco-run execution permission-prohibition determining process (FIG. 5) correspond to processes as engine automatic stop permission-prohibition means.

The above-described first embodiment of the invention achieves the following advantages.

(I) Since the width of hysteresis between the threshold values Tx and Ty of the engine cooling water temperature THW is set greater than the width needed to prevent hunting in control, the threshold value Ty for the time of decrease in the engine cooling water temperature THW is set at a sufficiently low-temperature side in comparison with the threshold value Tx for the time of increase in the engine cooling water temperature THW. That is, when the engine cooling water temperature THW is decreasing due to the automatic stop of the engine 10, the cabin temperature corresponds to a state where the engine cooling water temperature THW is higher than the present engine cooling water temperature THW, due to a delay during a transitional period. Therefore, the threshold value Ty for the time of decrease in the engine cooling water temperature THW can be set even lower than a threshold value that is conceived factoring in a width for preventing hunting in control with respect to the threshold value Tx for the time of increase in the engine cooling water temperature THW.

Since the threshold value Ty for the time of decrease in the engine cooling water temperature THW can be set sufficiently low, the engine automatic stop prohibition region can be reduced as indicated in FIG. 6. Hence, the automatically stopped state of the engine 10 can be maintained for an increased length of time, thereby enhancing the fuel economy improvement advantage.

(II) As indicated in FIG. 6, the threshold values Tx, Ty are variable in accordance with the needed blow-off temperature TAO of the air-conditioner unit 106, and is set so as to increase with increases in the needed blow-off temperature TAO. Therefore, in the case where the needed blow-off temperature TAO is set low in accordance with the outside air temperature TAM or an occupant's request, the automatically stopped state can be maintained for a longer time without adverse effect on air-conditioning, and the fuel economy improvement advantage can be increased, in comparison with the case where the needed blow-off temperature TAO is high. In the case where the needed blow-off temperature TAO is set high, the automatically stopped state can be prohibited at a relatively early stage, and therefore, adverse effect on air-conditioning can be avoided, in comparison with the case where the needed blow-off temperature TAO is low. In the case where the needed blow-off temperature TAO is set high, too, the threshold value Ty for the time of decrease in the engine cooling water temperature THW can be set sufficiently low, and the engine automatic stop prohibition region can be reduced, so that the automatically stopped state of the engine 10 can be maintained for an increased time. Therefore, the fuel economy improvement advantage can be further enhanced.

(III) The width of hysteresis between the threshold values Tx and Ty is set greater for higher needed blow-off temperatures TAO. In the case where the needed blow-off temperature TAO is high, the extent of delay of degradation in the air-conditioning comfort relative to decrease in the engine cooling water temperature THW is greater than in the case where the needed blow-off temperature TAO is low.

Therefore the width of hysteresis can be set greater in the case of higher needed blow-off temperature TAO. Therefore, the fuel economy improvement advantage can be further enhanced.

(IV) The hysteresis width is set within a range such that the cabin comfort is not degraded, if the engine cooling water temperature THW decreases from a state where the automatic stop of the engine 10 is permitted. Due to the setting of the hysteresis width within such a range that the cabin comfort is not degraded in the case of decrease in the engine cooling water temperature THW, it becomes possible to avoid discomforting an occupant in terms of air-conditioning and further reduce the engine automatic stop prohibition region and therefore further enhance the fuel economy improvement.

[Second Embodiment]

Figure 7:
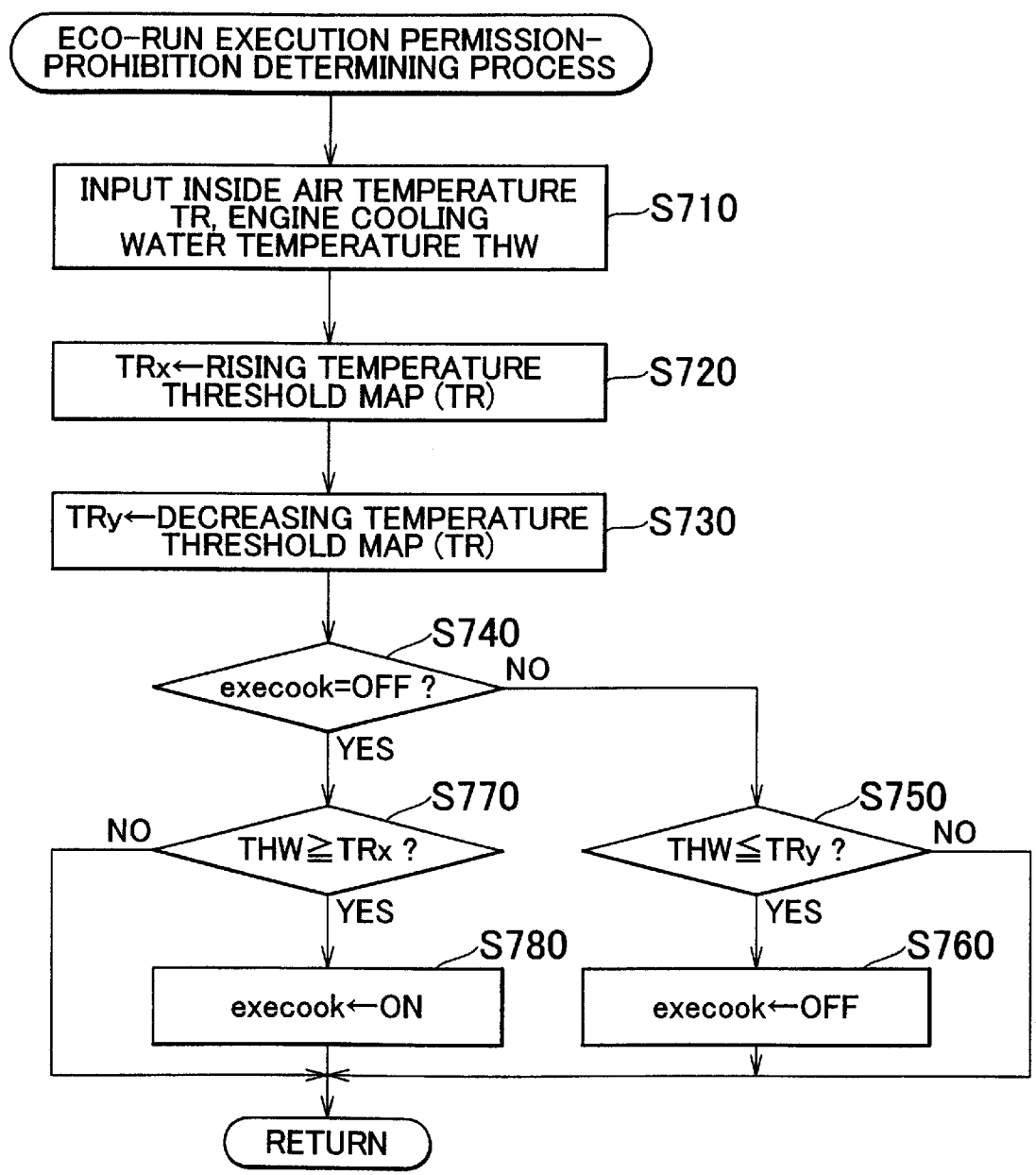
FIG. 7 is a flowchart illustrating an eco-run execution permission-prohibition determining process executed by an air-conditioner ECU in a second embodiment.
Figure 8:
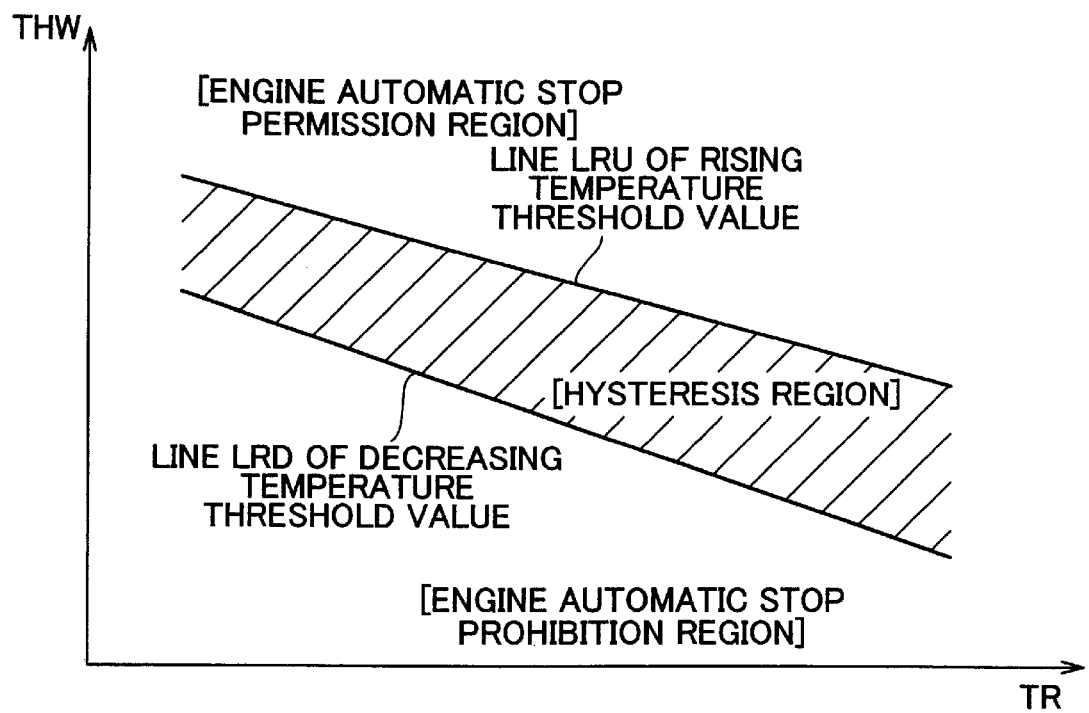
FIG. 8 is a graph indicating engine automatic stop permission and prohibition regions that represent states of threshold values used in the eco-run execution permission-prohibition determining process in the second embodiment.

A second embodiment of the invention differs from the first embodiment in that an eco-run execution permission-prohibition determining process illustrated in the flowchart of FIG. 7 is executed instead of the eco-run execution permission-prohibition determining process (FIG. 5). In relation to this, the second embodiment differs from the first embodiment in that a rising temperature threshold map and a decreasing temperature threshold map indicated in FIG. 8 are used instead of the rising temperature threshold map and the decreasing temperature threshold map indicated in FIG. 6. Other constructions are substantially the same as those in the first embodiment, unless otherwise mentioned.

When the eco-run execution permission-prohibition determining process begins, the inside air temperature TR and the engine cooling water temperature THW are input (S710). Subsequently, a rising temperature threshold value TRx is computed from a rising temperature threshold map on the basis of the value of inside air temperature TR (S720). The rising temperature threshold map corresponds to a line LRU of the rising temperature threshold value indicated in FIG. 8. That is, the value of the rising temperature threshold map tends to decrease with increases in the inside air temperature TR.

Subsequently, a decreasing temperature threshold value TRy is computed from a decreasing temperature threshold map on the basis of the value of inside air temperature TR (S730). The decreasing temperature threshold map corresponds to a line LRD of the decreasing temperature threshold value indicated in FIG. 8. That is, the value of the decreasing temperature threshold map, which is lower than the value of the rising temperature threshold map, tends to decrease with increases in the inside air temperature TR.

A region between the line LRU of the rising temperature threshold value and the line LRD of the decreasing temperature threshold value is a hysteresis region. That is, if the engine cooling water temperature THW is rising during the state of the eco-run execution permission flag execook="OFF", the line LRU of the decreasing temperature threshold value becomes a threshold value for setting the eco-run execution permission flag execook to the "ON" state. Conversely, if the engine cooling water temperature THW is decreasing while the eco-run execution permission flag execook="ON", the line LRD of the decreasing temperature threshold value becomes a threshold value for setting the eco-run execution permission flag execook to the "OFF" state.

The line LRU of the rising temperature threshold value is set, taking into consideration the delay of cabin temperature with respect to increase in the engine cooling water temperature THW, and is set so that once the line LRU is reached as temperature rises, a blow-off temperature that does not discomfort an occupant is achieved. After the line LRU is reached, the cabin temperature rises with a delay relative to the engine cooling water temperature THW. Therefore, even if the engine 10 is automatically stopped and the engine cooling water temperature THW begins to drop from the line LRU of the rising temperature threshold value, the decreasing blow-off temperature does not discomfort an occupant for a certain time.

The line LRD of the decreasing temperature threshold value is set, taking into consideration the delay of the cabin temperature with respect to decrease in the engine cooling water temperature THW. Therefore, the width of hysteresis set between the line LRU of the rising temperature threshold value and the line LRD of the decreasing temperature threshold value is considerably greater than the width of hysteresis that is needed for the purpose of preventing hunting in control (the width being, for example, 1° C.) as mentioned above in conjunction with the first embodiment. For example, in FIG. 8, the hysteresis width is set in the range of about 5 to about 15° C.

Subsequently, it is determined whether the present state of the eco-run execution permission flag execook is "OFF" (S740). If the eco-run execution permission flag execook="ON" (NO at S740) and the engine cooling water temperature THW is decreasing as a result of execution of the automatic stop (S440 in FIG. 3), it is then determined whether the engine cooling water temperature THW is lower than or equal to the decreasing temperature threshold value TRy (S750). As long as THW>TRy (NO at S750), the process temporarily ends without further processing. Therefore, if it is determined in step S530 in the automatic start-up process (FIG. 4) that the automatic startup condition is not met (NO at S530) while the state of the eco-run execution permission flag execook="ON" is maintained, the answer to step S550 is "NO", so that the automatically stopped state is maintained.

Then, as the automatic stop of the engine 10 continues and the engine cooling water temperature THW gradually decreases to the state of THW≦TRy (YES at S750), the eco-run execution permission flag execook is set to the "OFF" state (S760). Therefore, since a determination of "YES" is made in step S550 in the automatic startup process (FIG. 4) although it is determined in step S530 that the automatic startup condition is not met (NO at S530), step S540 is executed, thereby starting to operate the engine 10. In the automatic stop process (FIG. 3), since the eco-run execution permission flag execook is "OFF" (NO at S430) although it is determined that the automatic stop condition is met (YES at S420), the operating state of the engine 10 continues.

If the eco-run execution permission flag execook="OFF" is set, a determination of "YES" is made in step S740 in the next control cycle of the eco-run execution permission-prohibition determining process (FIG. 7). Subsequently, it is determined whether the engine cooling water temperature THW is higher than or equal to the rising temperature threshold value TRx (S770). As long as TRW<TRx (NO at S770), the process temporarily ends without further processing.

That is, if operation of the engine 10 is started in response to the eco-run execution permission flag execook="OFF" as described above, the engine cooling water temperature THW starts to gradually rise. However, since THW<TRx, the eco-run execution permission flag execook="OFF" is maintained for an early period. Therefore, even if it is determined in step S420 in the automatic stop process (FIG. 3) that the automatic stop condition is met (YES at S420), a determination of "NO" is made in step S430, so that the operating state of the engine 10 continues.

Then, as the engine 10 continues operating and the engine cooling water temperature THW gradually rises to the state of THW≦TRx (YES at S770), the eco-run execution permission flag execook is set to the "ON" state (S780). Therefore, since a determination of "YES" is made in step S430 in the automatic stop process (FIG. 3) if it is determined in step S420 that the automatic stop condition is met (YES at S420), the automatic stop of the engine 10 (S440) can be executed. In the automatic startup process (FIG. 4), too, a determination of "NO" is made at step S550 if it is determined that the automatic startup condition is not met (NO at S530). Therefore, the engine 10 is not forcibly started up. In this manner, the normal eco-run control can be executed.

In the above-described construction of the second embodiment, steps s410, S420 and S440 in the automatic stop process (FIG. 3) and steps S510 to S540 in the automatic startup process (FIG. 4) correspond to processes as engine automatic stop-startup means. Furthermore, step S430 in the automatic stop process (FIG. 3), step S550 in the automatic startup process (FIG. 4), and the eco-run execution permission-prohibition determining process (FIG. 7) correspond to processes as engine automatic stop permission-prohibition means.

The above-described second embodiment of the invention achieves the following advantages.

(I) As stated above in the advantage (I) of the first embodiment, since the width of hysteresis between the threshold values TRx and TRy of the engine cooling water temperature THW is set greater than the width needed to prevent hunting in control, the threshold value TRy for the time of decrease in the engine cooling water temperature THW is set at a sufficiently low-temperature side in comparison with the threshold value TRx for the time of increase in the engine cooling water temperature THW. That is, when the engine cooling water temperature THW is decreasing, the inside air temperature TR corresponds to the engine cooling water temperature THW which is higher than its present actual value, resulting from a delay during a transitional period. Therefore, the threshold value TRy for the time of decrease in the engine cooling water temperature THW can be set even lower than a threshold value that is conceived factoring in a width for preventing hunting in control with respect to the threshold value TRx for the time of increase in the engine cooling water temperature THW.

Since the threshold value TRy for the time of decrease in the engine cooling water temperature can be set sufficiently low, the engine automatic stop prohibition region can be reduced as indicated in FIG. 8. Hence, the automatically stopped state of the engine 10 can be maintained for an increased length of time, thereby enhancing the fuel economy improvement advantage.

(II) The hysteresis width is set within a range such that the cabin comfort is not degraded, if the engine cooling water temperature THW decreases from a state where the automatic stop of the engine 10 is permitted. Due to the setting of the hysteresis width within such a range that the cabin comfort is not degraded in the case of decrease in the engine cooling water temperature THW, it becomes possible to avoid discomforting an occupant in terms of air-conditioning and further reduce the engine automatic stop prohibition region and therefore further enhance the fuel economy improvement.

(III) As indicated in FIG. 8, the threshold values TRx, TRy are variable in accordance with the inside air temperature TR, and are set so as to decrease with the increases in the inside air temperature TR. Therefore, in the case where the inside air temperature TR is high, the automatically stopped state can be maintained for a longer time without adverse effect on air-conditioning, and the fuel economy improvement advantage can be further increased, in comparison with the case where the inside TR is low. In the case where the inside air temperature TR is low, the automatically stopped state can be prohibited at a relatively early stage, and therefore, adverse effect on air-conditioning can be avoided, in comparison with the case where the inside air temperature TR is high. Furthermore, in the case where the inside air temperature TR is low, the threshold value TRy for the time of decrease in the engine cooling water temperature THW is sufficiently low. Therefore, the engine automatic stop prohibition region can be sufficiently reduced, so that the automatically stopped state of the engine 10 can be maintained for an increased time. Therefore, the fuel economy improvement advantage can be further enhanced.

[Third Embodiment]

Figure 9:
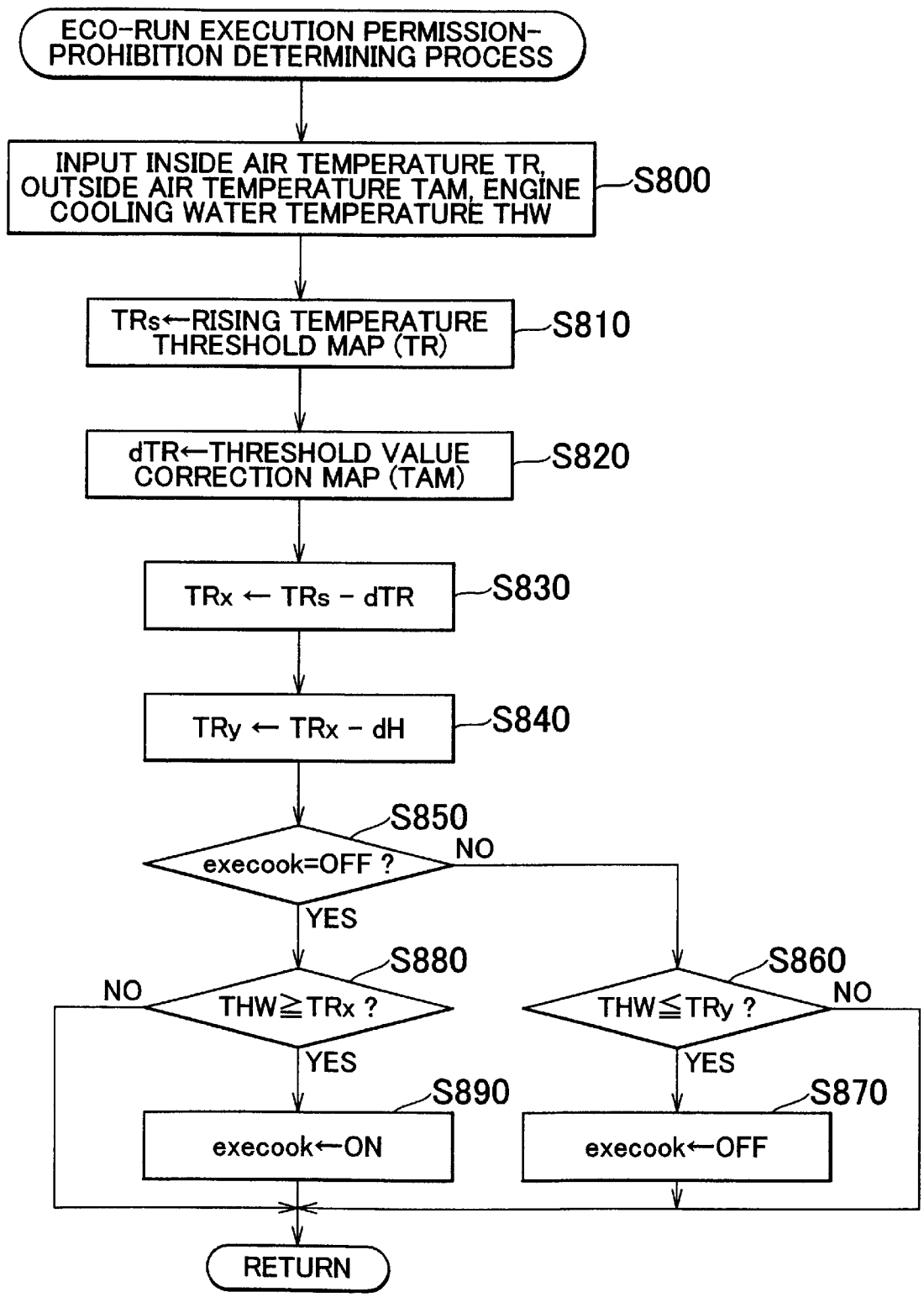
FIG. 9 is a flowchart illustrating an eco-run execution permission-prohibition determining process executed by an air-conditioner ECU in a third embodiment.
Figure 10:
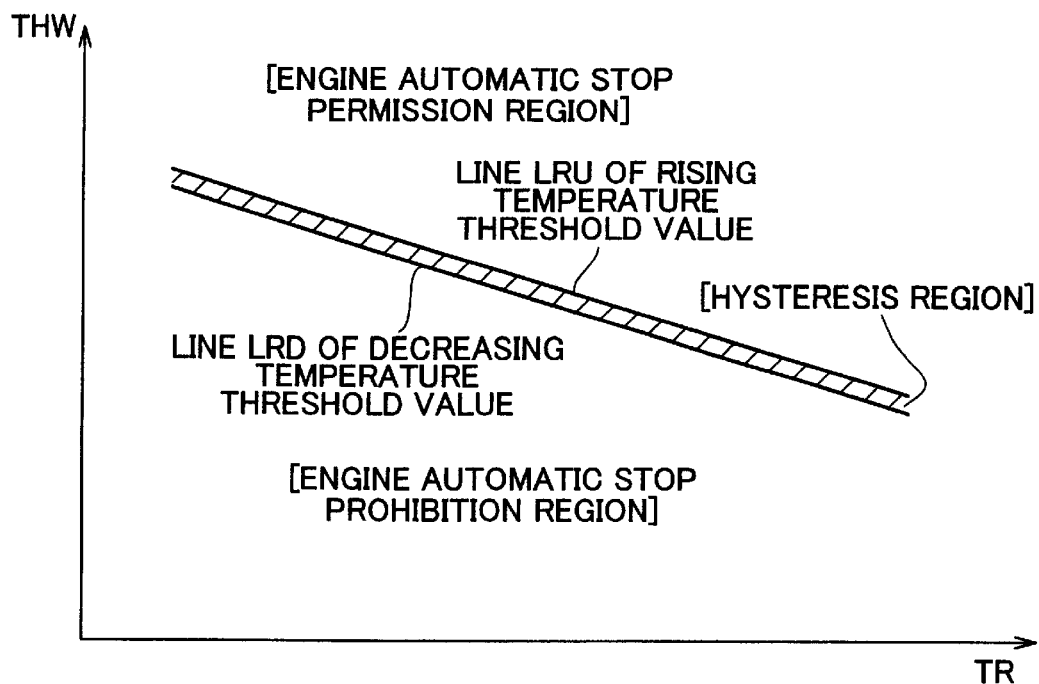
FIG. 10 is a graph indicating engine automatic stop permission and prohibition regions that represent states of threshold values used in the eco-run execution permission-prohibition determining process in the third embodiment.
Figure 11:
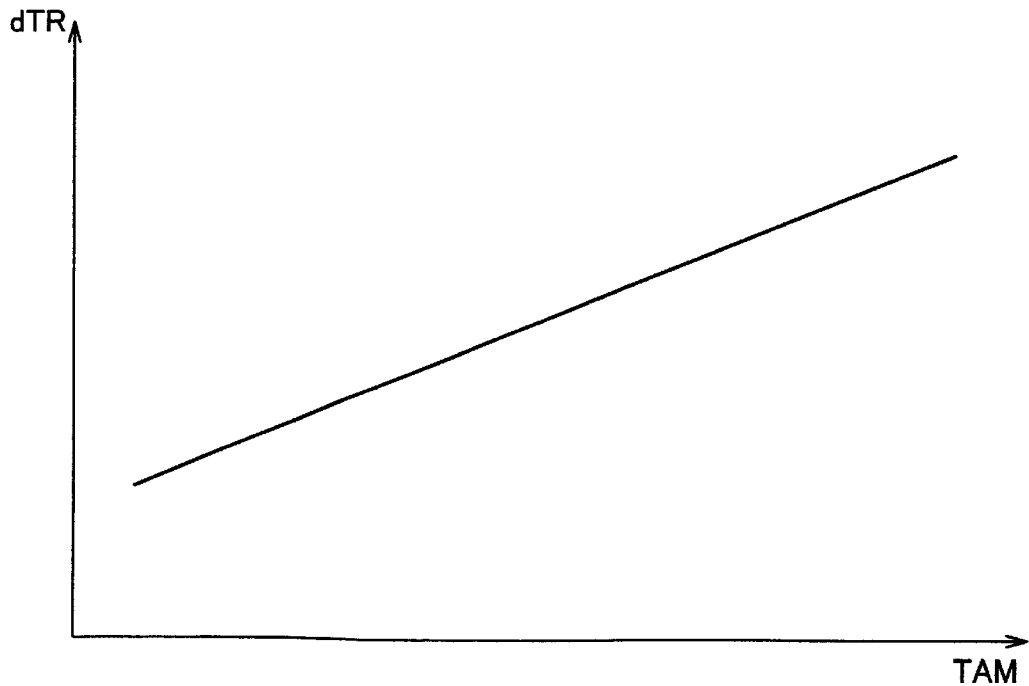
FIG. 11 is a diagram illustrating the construction of a threshold value correction map used in the eco-run execution permission-prohibition determining process in the third embodiment.

A third embodiment of the invention differs from the first embodiment in that an eco-run execution permission-prohibition determining process illustrated in the flowchart of FIG. 9 is executed instead of the eco-run execution permission-prohibition determining process illustrated in the flowchart of FIG. 5. In relation to this difference, the third embodiment also differs from the first embodiment in that a rising temperature threshold map indicated in FIG. 10 and a threshold value correction map indicated in FIG. 11 are used instead of the rising temperature threshold map and the decreasing temperature threshold map indicated in the engine automatic stop permission-prohibition illustrating diagram of FIG. 6. Other constructions are substantially the same as those in the first embodiment, unless otherwise mentioned.

When the eco-run execution permission-prohibition determining process begins, the inside air temperature TR, the outside air temperature TAM and the engine cooling water temperature THW are input (S800). Subsequently, a pre-correction rising temperature threshold value TRs is computed from a rising temperature threshold map on the basis of the value of inside air temperature TR (S810). The rising temperature threshold map corresponds to a line LRU of the rising temperature threshold value indicated in FIG. 10. That is, the value of the rising temperature threshold map tends to decrease with increases in the inside air temperature TR.

Subsequently, a threshold value correction amount dTR is computed from the threshold value correction map on the basis of the outside air temperature TAM (S820). The threshold value correction map, as indicated in FIG. 11, tends to increase with rises in the outside air temperature TAM.

Then, a rising temperature threshold value TRx is computed from the pre-correction rising temperature threshold value TRs and the threshold value correction amount dTR as in mathematical expression 2 (S830).

$$TRx \leftarrow TRs - dTR \qquad [2]$$

Expression 2 indicates that the rising temperature threshold value TRx is set progressively lower as the outside air temperature TAM rises.

Subsequently, a decreasing temperature threshold value TRy is computed from the rising temperature threshold value TRx and a hysteresis width dH set for preventing hunting in control as in mathematical expression 3 (S840).

$$TRy \leftarrow TRx - dH \qquad [3]$$

The hysteresis width dH in expression 3 is a mere hysteresis width that is needed for preventing hunting in control, and that is considerably smaller than the widths adopted in the first embodiment. For example, the hysteresis width dH=1° C. is set in the third embodiment.

Subsequently, it is determined whether the present state of the eco-run execution permission flag execook is "OFF" (S850). The processes of steps S850 to S890 are substantially the same as the processes of steps S740 to S780 in the second embodiment. That is, if the eco-run execution permission flag execook="ON" (NO at S850), the eco-run execution permission flag execook="ON" is maintained and the engine automatic stop permitted state continues while the engine cooling water temperature THW>TRy (NO at S860). However, when the state of THW≦TRy is reached (YES at S860), the eco-run execution permission flag execook is changed to the "OFF" state (S870), thus prohibiting the automatic stop of the engine 10. Therefore, if the engine 10 is in the automatically stopped state, the engine 10 is forcibly started up.

If the eco-run execution permission flag execook="OFF" (YES at S850), the eco-run execution permission flag execook="OFF" is maintained and the engine automatic stop prohibited state continues while THW<TRx (NO at S880). However, when the state of THW≧TRx is reached (YES at S880), the eco-run execution permission flag execook is changed to the "ON" state (S890), thus permitting execution of the automatic stop of the engine 10.

In the above-described construction of the third embodiment, steps s410, S420 and S440 in the automatic stop process (FIG. 3) and steps S510 to S540 in the automatic startup process (FIG. 4) correspond to processes as engine automatic stop-startup means. Furthermore, step S430 in the automatic stop process (FIG. 3), step S550 in the automatic startup process (FIG. 4), and the eco-run execution permission-prohibition determining process (FIG. 9) correspond to processes as engine automatic stop permission-prohibition means.

The above-described third embodiment of the invention achieves the following advantages.

(I) The threshold values TRx, TRy are variable in accordance with the inside air temperature TR. Therefore, the threshold values TRx, TRy can be set at sufficiently low levels in accordance with the air-conditioning situation indicated by the inside air temperature TR. That is, at a side of high inside air temperature TR, the threshold values TRx, TRy can be set low if the engine cooling water temperature THW decreases. Therefore, particularly in a region of high inside air temperature TR, the engine automatic stop prohibition region can be reduced.

Furthermore, the threshold values TRx, TRy are subjected to an increasing or decreasing correction, in this embodiment, only a decreasing correction, in accordance with the outside air temperature TAM, which is different from the inside air temperature TR. Therefore, the threshold values TRx, TRy can be set at even lower levels in accordance with the air-conditioning situation indicated by the outside air temperature TAM. That is, at a side of high outside air temperature TAM, the threshold value correction amount dTR becomes great, so that the threshold values TRx, TRy can be corrected so as to reduce in magnitude. Hence, particularly in a region of high outside air temperature TAM, the engine automatic stop prohibition region can be further reduced.

Therefore, the automatically stopped state of the engine 10 can be maintained for a long time, and the fuel economy improvement can be enhanced.

[Fourth Embodiment]

Figure 12:
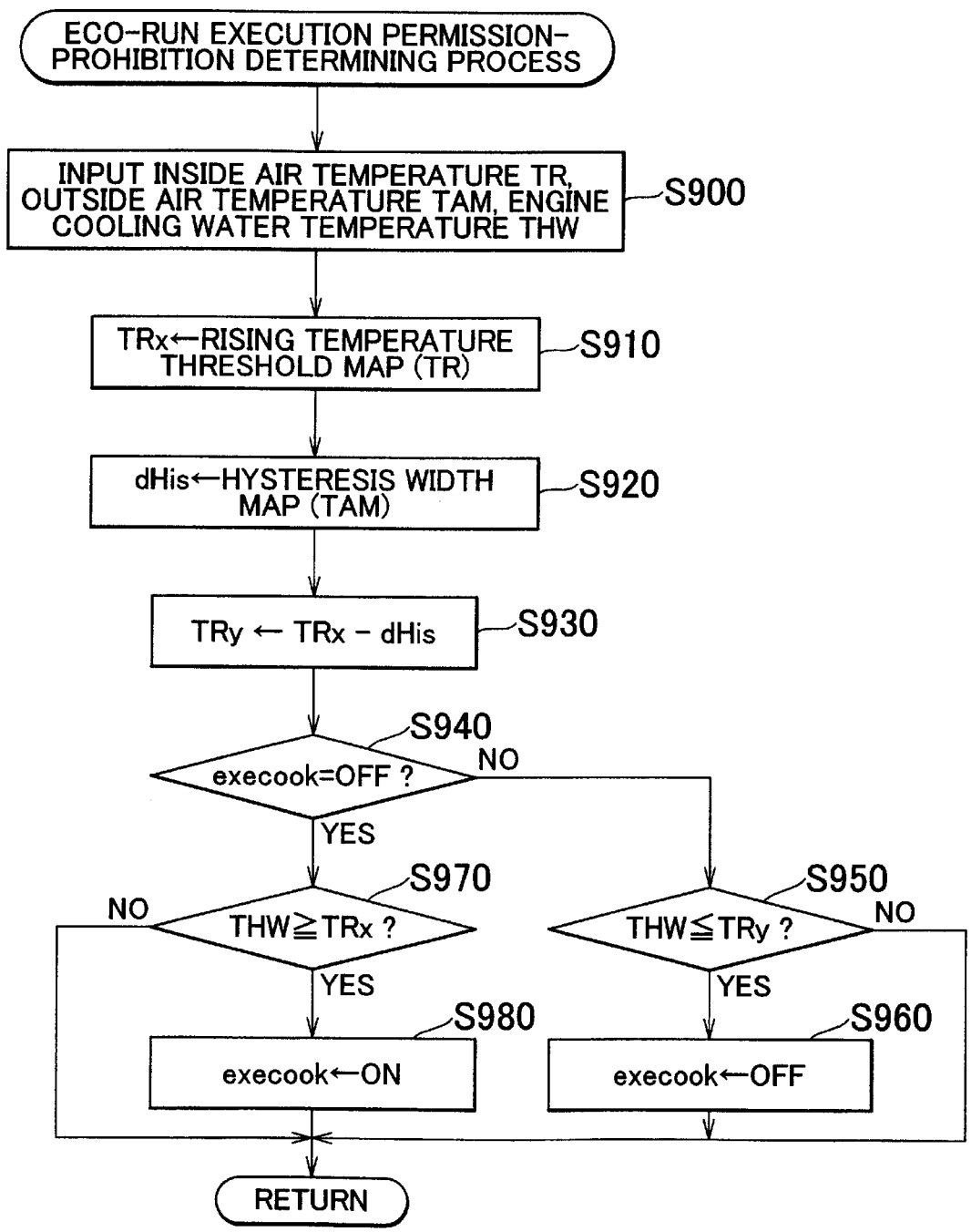
FIG. 12 is a flowchart illustrating an eco-run execution permission-prohibition determining process executed by an air-conditioner ECU in a fourth embodiment.
Figure 13:
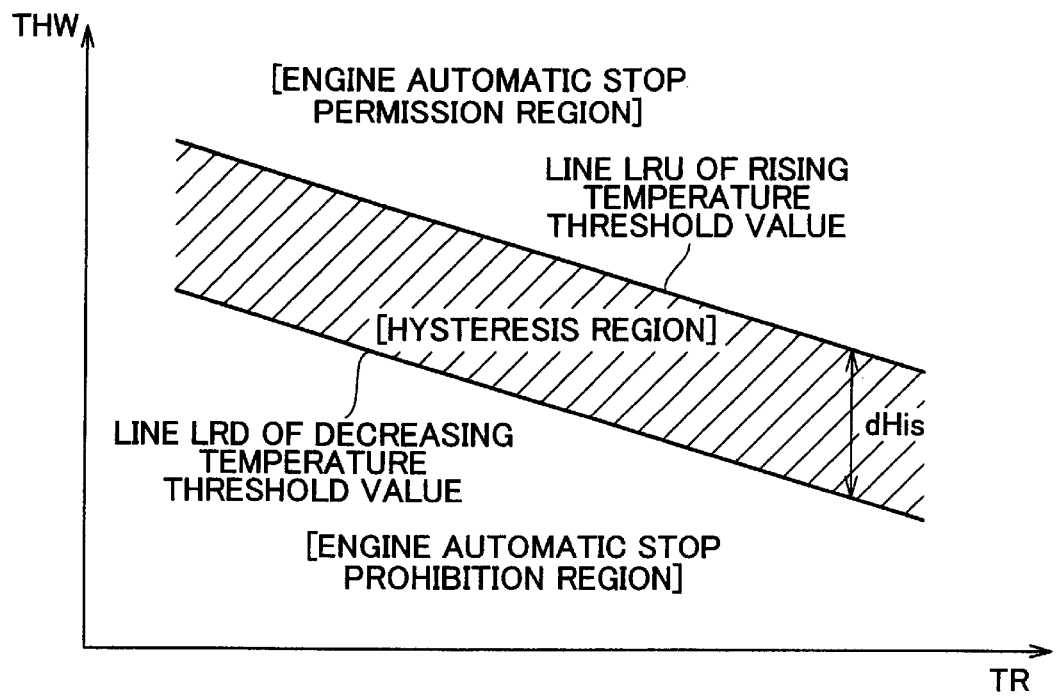
FIG. 13 is a graph indicating engine automatic stop permission and prohibition regions that represent states of threshold values used in the eco-run execution permission-prohibition determining process in the fourth embodiment.
Figure 14:
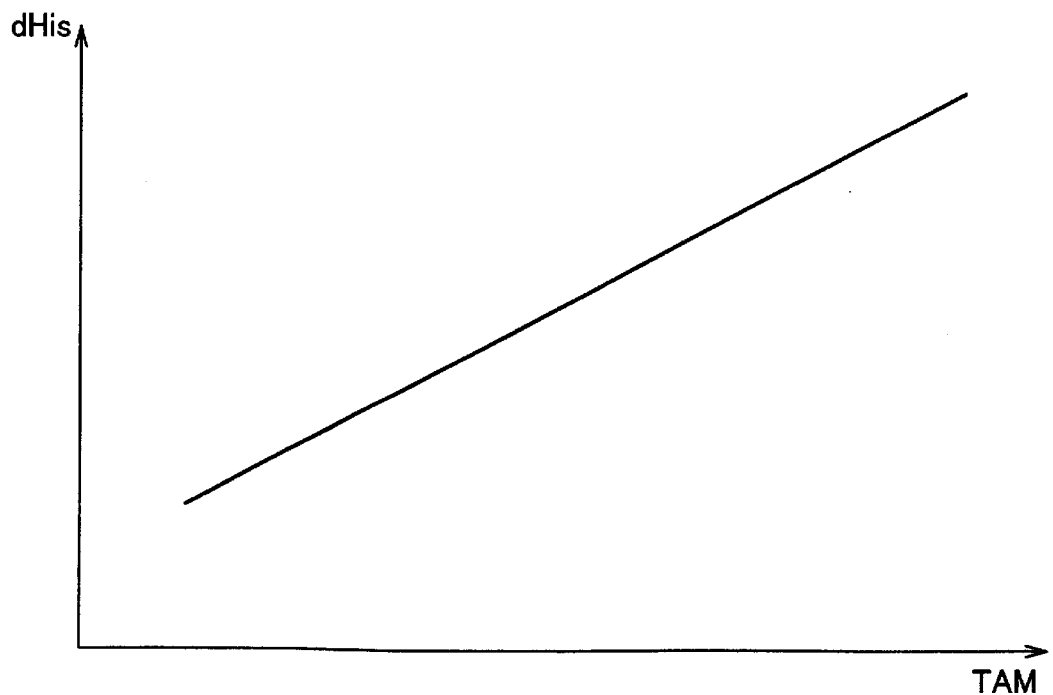
FIG. 14 is a diagram illustrating the construction a hysteresis width map used in the eco-run execution permission-prohibition determining process in the fourth embodiment.

A fourth embodiment of the invention differs from the first embodiment in that an eco-run execution permission-prohibition determining process illustrated in the flowchart of FIG. 12 is executed instead of the eco-run execution permission-prohibition determining process illustrated in the flowchart of FIG. 5. In relation to this difference, the fourth embodiment also differs from the first embodiment in that a rising temperature threshold map indicated in FIG. 13 and a hysteresis width map indicated in FIG. 14 are used instead of the rising temperature threshold map and the decreasing temperature threshold map indicated in the engine automatic stop permission-prohibition illustrating diagram of FIG. 6. Other constructions are substantially the same as those in the first embodiment, unless otherwise mentioned.

When the eco-run execution permission-prohibition determining process begins, the inside air temperature TR, the outside air temperature TAM and the engine cooling water temperature THW are input (S900). Subsequently, a rising temperature threshold value TRx is computed from the rising temperature threshold map on the basis of the value of inside air temperature TR (S910). The rising temperature threshold map corresponds to a line LRU of the rising temperature threshold value indicated in FIG. 13. That is, the value of the rising temperature threshold map tends to decrease with rises in the inside air temperature TR.

Subsequently, a hysteresis width dHis is computed from a hysteresis width map on the basis of the value of outside air temperature TAM (S920). The hysteresis width map is indicated in FIG. 14. The hysteresis width dHis tends to increase with rises in the external temperature TAM.

Then, a decreasing temperature threshold value TRy is calculated as in mathematical expression 4 (S930).

$$TRy \leftarrow TRx - dHis \quad [4]$$

Expression 4 indicates that the decreasing temperature threshold value TRy is set lower as the outside air temperature TAM rises.

Subsequently, it is determined whether the present state of the eco-run execution permission flag execook is "OFF" (S940). The processes of steps S940 to S980 are substantially the same as the processes of steps S740 to S780 in the second embodiment. That is, if the eco-run execution permission flag execook="ON" (NO at S940), the eco-run execution permission flag execook="ON" is maintained and the permission for automatic stop of the engine 10 continues while the engine cooling water temperature THW>TRy (NO at S950). However, when the state of THW>TRy is reached (YES at S950), the eco-run execution permission flag execook is changed to the "OFF" state (S960), thus prohibiting the automatic stop of the engine 10. Therefore, if the engine 10 is in the automatically stopped state, the engine 10 is forcibly started up.

If the eco-run execution permission flag execook="OFF" (YES at S940), the eco-run execution permission flag execook="OFF" is maintained and the prohibition of automatic stop continues while THW<TRx (NO at S970). However, when the state of THW≧TRx is reached (YES at S970), the eco-run execution permission flag execook is changed to the "ON" state (S980), thus permitting execution of the automatic stop process.

In the above-described construction of the fourth embodiment, steps s410, S420 and S440 in the automatic stop process (FIG. 3) and steps S510 to S540 in the automatic startup process (FIG. 4) correspond to processes as engine automatic stop-startup means. Furthermore, step S430 in the automatic stop process (FIG. 3), step S550 in the automatic startup process (FIG. 4), and the eco-run execution permission-prohibition determining process (FIG. 12) correspond to processes as engine automatic stop permission-prohibition means.

The above-described fourth embodiment achieves the following advantages.

(I) The rising temperature threshold value TRx is variable in accordance with the inside air temperature TR. Therefore, the rising temperature threshold value TRx can be set at a sufficiently low level in accordance with the air-conditioning situation indicated by the inside air temperature TR. That is, at a side of high inside air temperature TR, the rising temperature threshold value TRx can be set low if the engine cooling water temperature THW increases. Therefore, particularly in a region of high inside air temperature TR, the engine automatic stop prohibition region can be reduced. Hence, particularly in a region of high outside air temperature TAM, the engine automatic stop prohibition region can be reduced, and therefore the fuel economy improvement advantage can be enhanced.

(II) Furthermore, the decreasing temperature threshold value TRy is set below the rising temperature threshold value TRx due to the hysteresis width dHis set in accordance with the outside air temperature TAM. The hysteresis width dHis is variable in accordance with the outside air temperature TAM, and is set progressively greater as the outside air temperature TAM becomes higher. A reason for this setting is that in a case where the outside air temperature TAM is higher, the degree of degradation of the air-conditioning comfort relative to a decrease in the engine cooling water temperature THW is less and therefore the hysteresis width dHis can be set greater than in a case where the outside air temperature TAM is lower. Therefore, the automatically stopped state of the engine 10 can be maintained for an increased length of time, and the fuel economy improvement advantage can be further enhanced.

Modifications of the embodiments of the internal combustion engine control apparatus of the invention will be mentioned below.

(a) Although in the foregoing embodiments, the threshold values, the threshold value correction amount and the hysteresis width are computed by using maps, those values and amounts may be determined through calculations based on functions.

Figure 15:
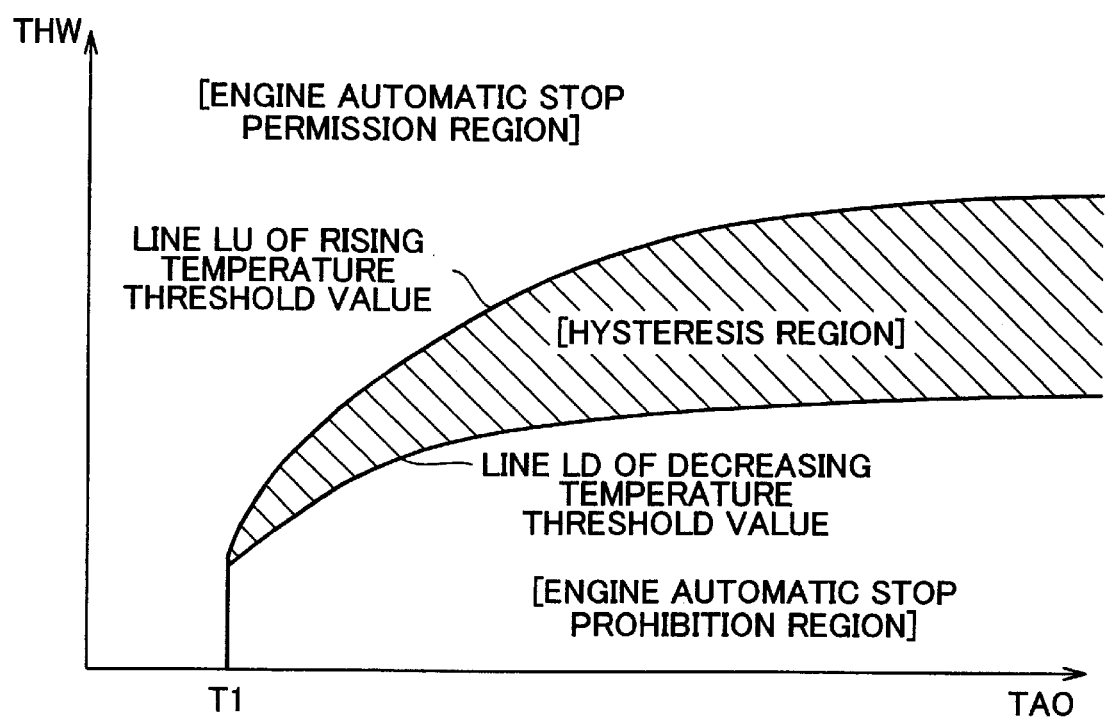
FIG. 15 is a diagram indicating engine automatic stop permission and prohibition regions that represent states of threshold values in accordance with a modification of the first embodiment.

(b) Although the rising temperature threshold map and the decreasing temperature threshold map in the first embodiment are formed as linear maps as indicated in FIG. 6, the maps may also be formed with higher precision as indicated in FIG. 15. This allows more appropriate control of the automatic stop-automatic startup process, and further enhances the fuel economy improvement advantage without degrading the air-conditioning state.

(c) In each of the foregoing embodiments, the threshold values or the hysteresis width is set on the basis of the needed blow-off temperature TAO, the inside air temperature TR or the outside air temperature TAM. Among these temperature values, the needed blow-off temperature TAO and the outside air temperature TAM are values that are related to the cabin temperature. Other values related to the cabin temperature, for example, values related to the needed blow-off temperature TAO or the outside air temperature TAM, may also be used to set threshold values or a hysteresis width.

(d) Although in the foregoing embodiments, the motor-generator 64 is disposed outside the power transmission path from the engine 10 to the driving wheels, the invention is also applicable to an internal combustion engine in a hybrid-type system in which a motor-generator is disposed in a power transmission path from the engine to driving wheels (e) Although in the foregoing embodiments, the engine 10 is a direct injection type gasoline engine, the invention is also applicable to other types of engines, such as port injection type gasoline engines, diesel engines, etc.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular internal combustion engine control apparatus comprising:
   engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and
   engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value,
   wherein the threshold value related to the engine automatic stop permission-prohibition means is variable in accordance with at least one of an inside-cabin temperature and values related to the inside-cabin temperature, and
   wherein a hysteresis width of the threshold value is set greater than a hysteresis width that is needed to prevent hunting in control.

2. The vehicular internal combustion engine control apparatus according to claim 1, wherein the hysteresis width is set in such a range that a cabin comfort is not degraded if the temperature of the cooling medium decreases from a state where the automatic stop is permitted by the engine automatic stop permission-prohibition means.

3. The vehicular internal combustion engine control apparatus according to claim 1,
   wherein the threshold value is variable in accordance with a needed blow-off temperature provided at a time of automatic air-conditioning of the cabin air-conditioner which is a value related to the inside-cabin temperature, and
   wherein the threshold value rises as the needed blow-off temperature rises.

4. The vehicular internal combustion engine control apparatus according to claim 3, wherein the threshold value is reduction-corrected as at least one of an outside-cabin air temperature and an inside-cabin air temperature rises.

5. The vehicular internal combustion engine control apparatus according to claim 3, wherein the hysteresis width increases as the needed blow-off temperature rises.

6. The vehicular internal combustion engine control apparatus according to claim 1,
   wherein the threshold value is variable in accordance with the inside-cabin temperature, and
   wherein the threshold value decreases as the inside-cabin temperature rises.

7. The vehicular internal combustion engine control apparatus according to claim 6,
   wherein the hysteresis width is variable in accordance with an outside-cabin air temperature which is a value related to the inside-cabin temperature, and
   wherein the hysteresis width increases as the outside-cabin air temperature rises.

8. A vehicular internal combustion engine control apparatus comprising:
   engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and
   engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value,
   wherein the threshold value related to the engine automatic stop permission-prohibition means and a hysteresis width of the threshold value are variable in accordance with at least one of an inside-cabin temperature and values related to the inside-cabin temperature.

9. The vehicular internal combustion engine control apparatus according to claim 8, wherein the hysteresis width is set greater than a hysteresis width that is needed to prevent hunting in control.

10. The vehicular internal combustion engine control apparatus according to claim 8, wherein the hysteresis width is set in such a range that a cabin comfort is not degraded if the temperature of the cooling medium decreases from a state where the automatic stop is permitted by the engine automatic stop permission-prohibition means.

11. The vehicular internal combustion engine control apparatus according to claim 8, wherein the threshold value is variable in accordance with a needed blow-off temperature provided at a time of automatic air-conditioning of the cabin air-conditioner which is a value related to the inside-cabin temperature, and wherein the threshold value rises as the needed blow-off temperature rises.

12. The vehicular internal combustion engine control apparatus according to claim 11, wherein the threshold value is reduction-corrected as at least one of an outside-cabin air temperature and an inside-cabin air temperature rises.

13. The vehicular internal combustion engine control apparatus according to claim 11, wherein the hysteresis width of the threshold value is expanded as at least one of an outside-cabin air temperature and an inside-cabin air temperature rises.

14. The vehicular internal combustion engine control apparatus according to claim 11, wherein the hysteresis width of the threshold value is expanded toward a low temperature side as at least one of an outside-cabin air temperature and an inside-cabin air temperature rises.

15. The vehicular internal combustion engine control apparatus according to claim 11, wherein the hysteresis width increases as the needed blow-off temperature rises.

16. The vehicular internal combustion engine control apparatus according to claim 15, wherein the hysteresis width of the threshold value is expanded toward a low temperature side as the needed blow-off temperature rises.

17. The vehicular internal combustion engine control apparatus according to claim 8, wherein the threshold value is variable in accordance with the inside-cabin temperature, and wherein the threshold value decreases as the inside-cabin temperature rises.

18. The vehicular internal combustion engine control apparatus according to claim 17, wherein the hysteresis width is variable in accordance with an outside-cabin air temperature which is a value related to the inside-cabin temperature, and wherein the hysteresis width increases as the outside-cabin air temperature rises.

19. A vehicular internal combustion engine control apparatus comprising:

engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value, wherein the threshold value is variable in accordance with a first value selected from an inside-cabin temperature and values related to the inside-cabin temperature, and wherein the threshold value is increase-decrease corrected in accordance with a second value that is different from the first value and that is selected from the inside-cabin temperature and the values related to the inside-cabin temperature.

20. The vehicular internal combustion engine control apparatus according to claim 19, wherein the first value is the inside-cabin temperature, and the second value is an outside-cabin air temperature.

21. A vehicular internal combustion engine control apparatus comprising:

engine automatic stop-startup means for automatically stopping the internal combustion engine if a state of operation of the internal combustion engine satisfies an automatic stop condition, and for automatically starting the internal combustion engine if the state of operation of the internal combustion engine satisfies an automatic startup condition; and engine automatic stop permission-prohibition means for permitting an automatic stop of the internal combustion engine if a temperature of a cooling medium of the internal combustion engine used as an air-conditioning heat source by a cabin air-conditioner is higher than a threshold value, and for prohibiting the automatic stop if the temperature of the cooling medium is lower than the threshold value, wherein a range for execution of the automatic stop and an automatic start-up of the internal combustion engine is set in such a range that a cabin temperature comfort is not degraded if the temperature of the cooling medium decreases, in accordance with an air-conditioning situation.

22. A method for controlling a vehicular internal combustion engine comprising the steps of:

automatically stopping the internal combustion engine if a state of operation of the internal combustion engine satisfies an automatic stop condition;

automatically starting the internal combustion engine if the state of operation of the internal combustion engine satisfies an automatic startup condition;

permitting an automatic stop of the internal combustion engine if a temperature of a cooling medium of the internal combustion engine used as an air-conditioning heat source by a cabin air-conditioner is higher than a threshold value;

prohibiting the automatic stop if the temperature of the cooling medium is lower than the threshold value;

changing the threshold value in accordance with at least one of an inside-cabin temperature and values related to the inside-cabin temperature, in order to set a hysteresis width of the threshold value greater than a hysteresis width that is needed to prevent hunting in control.

* * * * *